(12) United States Patent
Hara

(10) Patent No.: US 9,400,037 B2
(45) Date of Patent: Jul. 26, 2016

(54) BICYCLE CHAIN TENSIONER

(71) Applicant: Shimano Inc., Sakai, Osaka (JP)

(72) Inventor: Nobukatsu Hara, Osaka (JP)

(73) Assignee: Shimano Inc., Osaka (JP)

( * ) Notice: Subject to any disclaimer, the term of this patent is extended or adjusted under 35 U.S.C. 154(b) by 63 days.

(21) Appl. No.: 14/066,943

(22) Filed: Oct. 30, 2013

(65) Prior Publication Data

US 2014/0357437 A1 Dec. 4, 2014

Related U.S. Application Data

(63) Continuation-in-part of application No. 13/910,043, filed on Jun. 4, 2013.

(51) Int. Cl.
| | | |
|---|---|---|
| *F16H 9/00* | (2006.01) | |
| *F16H 59/00* | (2006.01) | |
| *F16H 61/00* | (2006.01) | |
| *F16H 63/00* | (2006.01) | |
| *F16H 7/12* | (2006.01) | |
| *B62M 9/16* | (2006.01) | |

(52) U.S. Cl.
CPC ... *F16H 7/12* (2013.01); *B62M 9/16* (2013.01)

(58) Field of Classification Search
CPC .... B62M 9/1342; B62M 9/124; B62M 9/134; B62M 9/126; B62M 9/122

USPC ....................................................... 474/80, 81
See application file for complete search history.

(56) References Cited

U.S. PATENT DOCUMENTS

| 3,121,575 | A | * | 2/1964 | Bourgi | 280/236 |
|---|---|---|---|---|---|
| 3,785,219 | A | * | 1/1974 | Anthamatten | 474/81 |
| 3,901,095 | A | * | 8/1975 | Wechsler | 474/81 |
| 5,213,549 | A | * | 5/1993 | Blanchard | 474/81 |
| 6,159,118 | A | * | 12/2000 | Campbell | 474/78 |
| 7,905,805 | B2 | * | 3/2011 | Hara | 474/81 |
| 7,955,205 | B2 | * | 6/2011 | Urabe | 474/80 |
| 2006/0270499 | A1 | * | 11/2006 | Kilshaw | B62M 9/04 474/78 |

FOREIGN PATENT DOCUMENTS

WO 9301967 2/1993

* cited by examiner

*Primary Examiner* — Henry Liu
(74) *Attorney, Agent, or Firm* — Global IP Counselors

(57) ABSTRACT

A bicycle chain tensioner includes a bicycle mounting bracket, and a chain tensioning element. The bicycle mounting bracket is configured to be mounted to a bicycle. The chain tensioning element is movably coupled to the bicycle mounting bracket by a first coupling structure to move in a lateral direction and by a second coupling structure to move in a direction different from the lateral direction, during operation of the bicycle chain tensioner.

21 Claims, 13 Drawing Sheets

BICYCLE CHAIN TENSIONER

CROSS-REFERENCE TO RELATED APPLICATIONS

This application is a continuation-in-part application of U.S. patent application Ser. No. 13/910,043 filed on Jun. 4, 2013. The entire disclosure of U.S. patent application Ser. No. 13/910,043 is hereby incorporated herein by reference.

BACKGROUND

1. Field of the Invention

This invention generally relates to a bicycle chain tensioner. More specifically, the present invention relates to a bicycle chain tensioner for a bicycle.

2. Background Information

A bicycle typically uses a chain drive transmission for transmitting a pedaling force to a rear wheel. The chain drive transmission of a bicycle often uses derailleurs to selectively move a chain from one of a plurality of sprockets to another for changing speeds of the bicycle. The sprockets provide different gear ratios based on different diameters of the sprockets. As the chain is moved from one of the sprockets to another, the chain will be naturally loosen, which could allow the chain to disengage from the sprocket, or tighten, which could cause the chain to break, due to the different diameters of the sprockets. Thus, a bicycle chain tensioner is conventionally used for properly applying tension to the chain in a chain drive transmission. A conventionally known bicycle chain tensioner is pivotally mounted to the bicycle with a movable arm supporting a tension sprocket at its free end. The bicycle chain tensioner also includes a coil spring that biases the tension sprocket into engagement with the chain.

Referring to U.S. Pat. No. 7,955,205, a conventional chain tension applying device is disclosed. With this chain tension applying device, a securing position adjust mechanism adjusts a securing position of a tension member to a bracket in a first direction by sliding. The first direction is substantially parallel to an axial direction of a rotation shaft of a rear sprocket. Furthermore, referring to International Publication No. WO93/01967, a derailleur for multi-speed bicycle is disclosed. With this derailleur for multi-speed bicycle, a chain take-up device includes an elongated member extending along a bar, movable longitudinally along and guided by the bar and carrying at its rear end a drive chain tensioning member. The chain take-up device pivotally moves following a pivotal motion of the bar which is provided by a cooperation of a pivot pin, a lever, a hook and a slot. The pivotal motion of the bar provides a gear shifting of a bicycle. Moreover, referring to U.S. Pat. No. 7,905,805, a tension device of a bicycle derailleur is disclosed. With this tension device, a second pulley for applying tension to a drive chain is rotatably mounted on a second cage, and the second cage is slidably engaged to a track of a slide device such that the cage can linearly slide along the track. The tension device is mounted by first and second bushing members that absorbs and dampens impacts on any component attached to a mounting frame, which also allows a pendulum motion of the tension device.

SUMMARY

Generally, the present disclosure discloses various features of a bicycle chain tensioner. In one feature, a bicycle chain tensioner is provided that provides a compact arrangement.

In accordance with a first aspect of the present invention, a bicycle chain tensioner includes a bicycle mounting bracket, and a chain tensioning element. The bicycle mounting bracket is configured to be mounted to a bicycle. The chain tensioning element is movably coupled to the bicycle mounting bracket by a first coupling structure to move in a lateral direction and by a second coupling structure to move in a direction different from the lateral direction, during operation of the bicycle chain tensioner.

In accordance with a second aspect of the present invention, the bicycle chain tensioner according to the first aspect is configured such that the chain tensioning element is slidably coupled to the bicycle mounting bracket by the first coupling structure to move in the lateral direction.

In accordance with a third aspect of the present invention, the bicycle chain tensioner according to the second aspect is configured such that the first coupling structure includes an interchangeable slide shaft having an effective length that defines an amount of sliding movement of the chain tensioning element relative to the bicycle mounting bracket.

In accordance with a fourth aspect of the present invention, the bicycle chain tensioner according to the second aspect is configured such that the first coupling structure includes a first biasing member biasing the chain tensioning element toward a neutral position in the lateral direction.

In accordance with a fifth aspect of the present invention, the bicycle chain tensioner according to the first aspect is configured such that the chain tensioning element is pivotally coupled to the bicycle mounting bracket by the first coupling structure to pivot about a longitudinal pivot axis.

In accordance with a sixth aspect of the present invention, the bicycle chain tensioner according to the fifth aspect is configured such that the first coupling structure includes a damping structure that is configured to damp movement of the chain tensioning element relative to the bicycle mounting bracket.

In accordance with a seventh aspect of the present invention, the bicycle chain tensioner according to the sixth aspect is configured such that the damping structure has a link axle with a sliding part, and a friction generating member frictionally coupled to the sliding part of the link axle.

In accordance with an eighth aspect of the present invention, the bicycle chain tensioner according to the seventh aspect is configured such that the damping structure further has a friction adjustment member that is configured to adjust frictional coupling force of the friction generating member relative to the sliding part of the link axle.

In accordance with a ninth aspect of the present invention, the bicycle chain tensioner according to the seventh aspect is configured such that the first coupling structure further includes a linkage pivotally coupling the chain tensioning element relative to the bicycle mounting bracket. The linkage has a link member that is fixedly coupled to the link axle of the damping structure.

In accordance with a tenth aspect of the present invention, the bicycle chain tensioner according to the first aspect is configured such that the chain tensioning element is pivotally coupled to the bicycle mounting bracket by the second coupling structure about a vertical pivot axis substantially parallel to a bicycle longitudinal center plane and substantially perpendicular to the lateral direction.

In accordance with an eleventh aspect of the present invention, the bicycle chain tensioner according to the tenth aspect is configured such that the second coupling structure includes an adjustment element adjustably arranged for adjusting an amount of pivotal movement of the chain tensioning element relative to the bicycle mounting bracket.

In accordance with a twelfth aspect of the present invention, the bicycle chain tensioner according to the tenth aspect is configured such that the second coupling structure includes a damping structure that is configured to damp movement of the chain tensioning element relative to the bicycle mounting bracket.

In accordance with a thirteenth aspect of the present invention, the bicycle chain tensioner according to the first aspect further includes a guiding portion and a chain engaging element. The guiding portion is movably coupled to the bicycle mounting bracket by the first coupling structure and the second coupling structure. The chain engaging element is movably coupled to the guiding portion.

In accordance with a fourteenth aspect of the present invention, the bicycle chain tensioner according to the first aspect is configured such that the lateral direction is substantially perpendicular to a bicycle longitudinal center plane.

In accordance with a fifteenth aspect of the present invention, a bicycle chain tensioner includes a chain tensioning element, a bicycle mounting bracket, a guiding portion, a chain engaging element, and a second biasing member. The bicycle mounting bracket is configured to be mounted to a bicycle. The guiding portion is coupled to the bicycle mounting bracket. The chain engaging element is movably coupled to the guiding portion. The second biasing member is coupled to the guiding portion. The second biasing member biases the chain engaging element to a first position. The second biasing member overlaps with the guiding portion as view along at least one of a lateral direction and a vertical direction.

In accordance with a sixteenth aspect of the present invention, the bicycle chain tensioner according to the fifteenth aspect is configured such that the lateral direction is substantially perpendicular to a bicycle longitudinal center plane, and the vertical direction is substantially parallel to the bicycle longitudinal center plane.

These and other objects, features, aspects and advantages will become apparent to those skilled in the art from the following detailed description, which, taken in conjunction with the annexed drawings, discloses selected embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
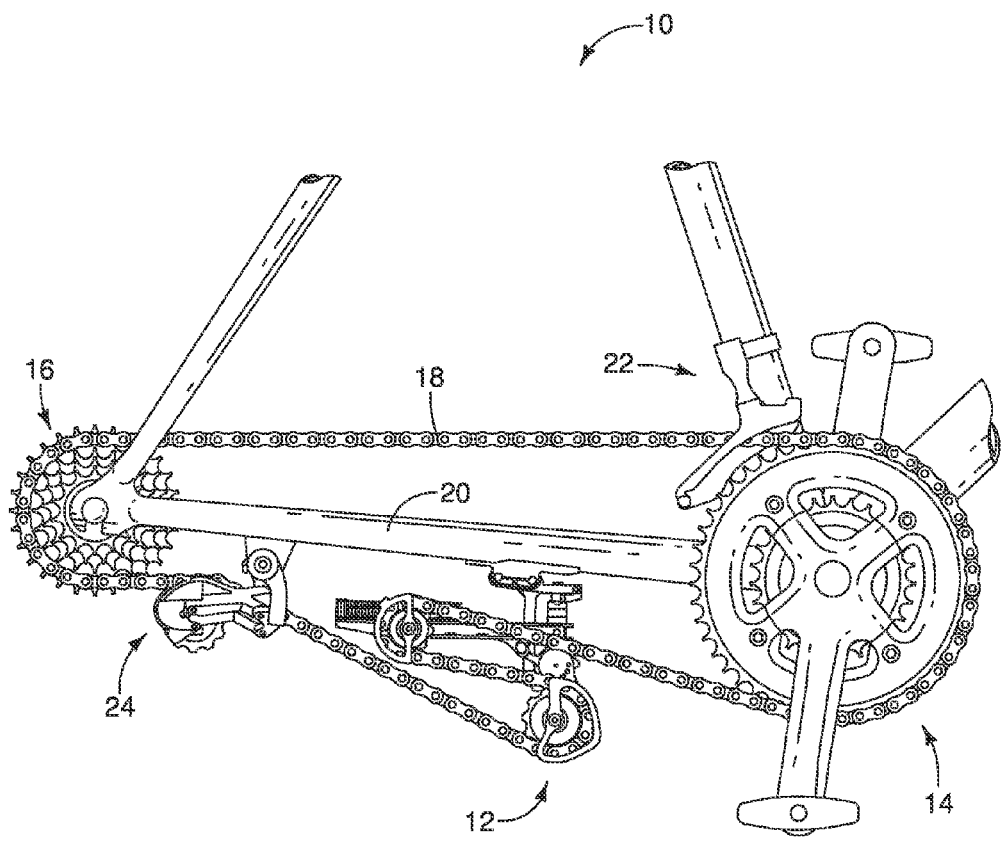
FIG. 1 is a partial side elevational view of a bicycle including a bicycle chain tensioner in accordance with a first embodiment.

Referring initially to FIG. 1, a bicycle 10 is illustrated that is equipped with a bicycle chain tensioner 12 in accordance with a first embodiment. The bicycle 10 further includes, among other things, a front crankset 14, a rear gear cassette 16, a drive chain 18 (e.g., a chain) that connects the front crankset 14 to the rear gear cassette 16. The front crankset 14 is rotatably supported to a bicycle frame 20 by a conventional bottom bracket in a conventional manner. The bicycle 10 further includes a front derailleur 22 and a rear derailleur 24 for shifting the chain 18 laterally to change gears. The front and rear derailleurs 22 and 24 are operatively connected to shifters (not shown) for operating the front and rear derailleurs 22 and 24 in a conventional manner.

The bicycle 10 is conventional, except for the bicycle chain tensioner 12 as discussed below. Thus, the bicycle 10 will not be discussed and/or illustrated in detail herein, except as related to the present invention. Rather, it will be apparent to those skilled in the art from this disclosure that the bicycle 10 includes various conventional bicycle components such as wheels, shifters, a handle etc. coupled to the bicycle frame 20 in a conventional manner. Moreover, it will be apparent to those skilled in the art from this disclosure that various modifications can be made to the bicycle 10 and its various components without departing from the present invention, as described and illustrated herein. Finally, it will be apparent to those skilled in the art from this disclosure that the bicycle 10 can be used on various types of bicycle such as road or mountain bicycles as needed and/or desired.

As illustrated in FIG. 1, the bicycle chain tensioner 12, the front crankset 14, the rear gear cassette 16, and the rear derailleur 24 engage with the chain 18 to form a bicycle drive train of the bicycle 10 that transmits a rotation of pedals of the front crankset 14 to the rear gear cassette 16 and a rear wheel (not shown). The bicycle chain tensioner 12 and the rear derailleur 24 are fixedly coupled to a chain stay of the bicycle frame 20. In the illustrated embodiment, the rear derailleur 24 is a conventional rear derailleur device with only a guide pulley, such as in U.S. Pat. No. 7,905,805, for example. Thus, detailed description of the rear derailleur 24 will be omitted for the sake of brevity. Of course, the rear derailleur 24 can be different types of rear derailleurs, as needed or desired.

Figure 2:
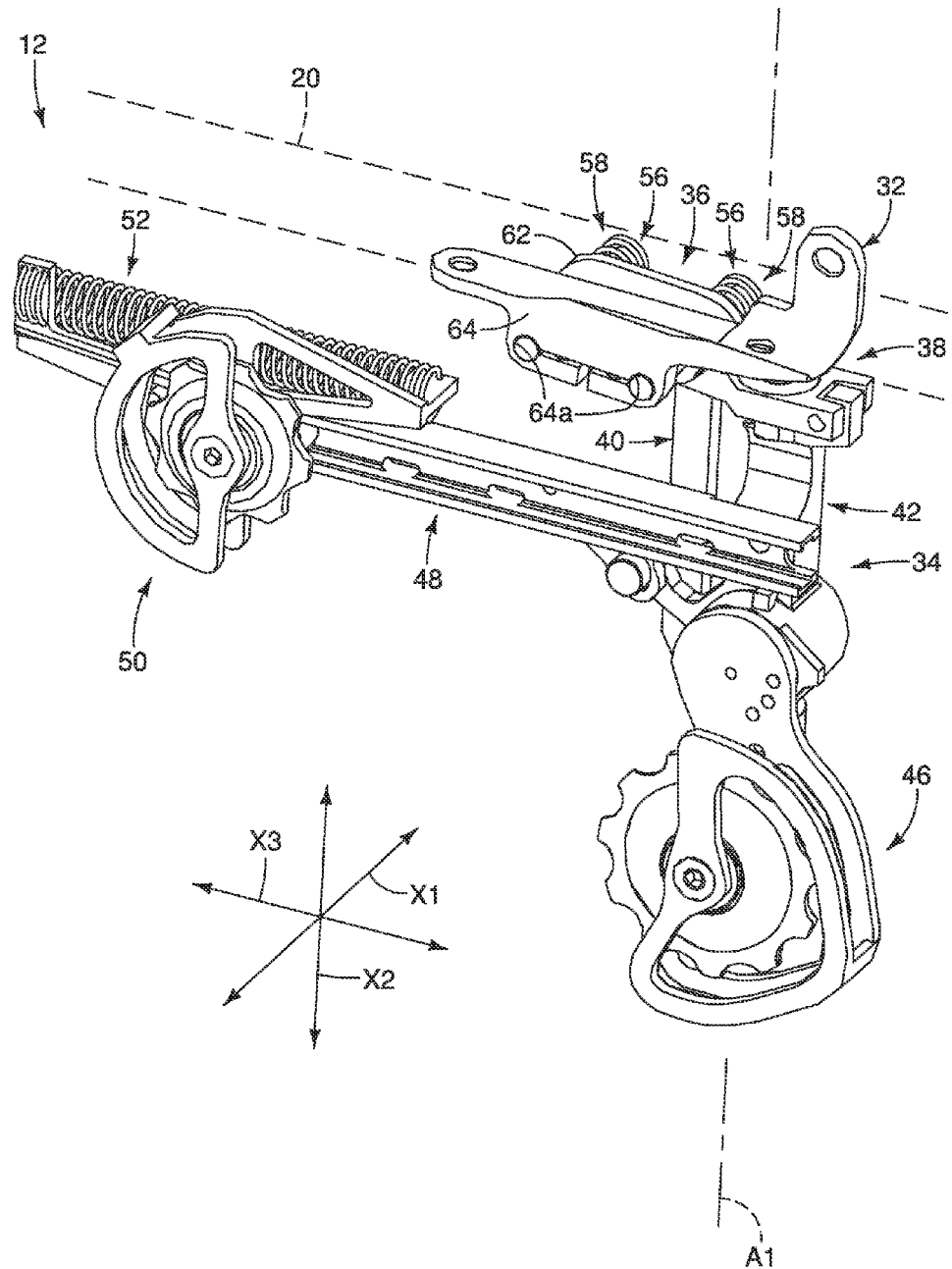
FIG. 2 is an outside perspective view of the bicycle chain tensioner illustrated in FIG. 1.
Figure 3:
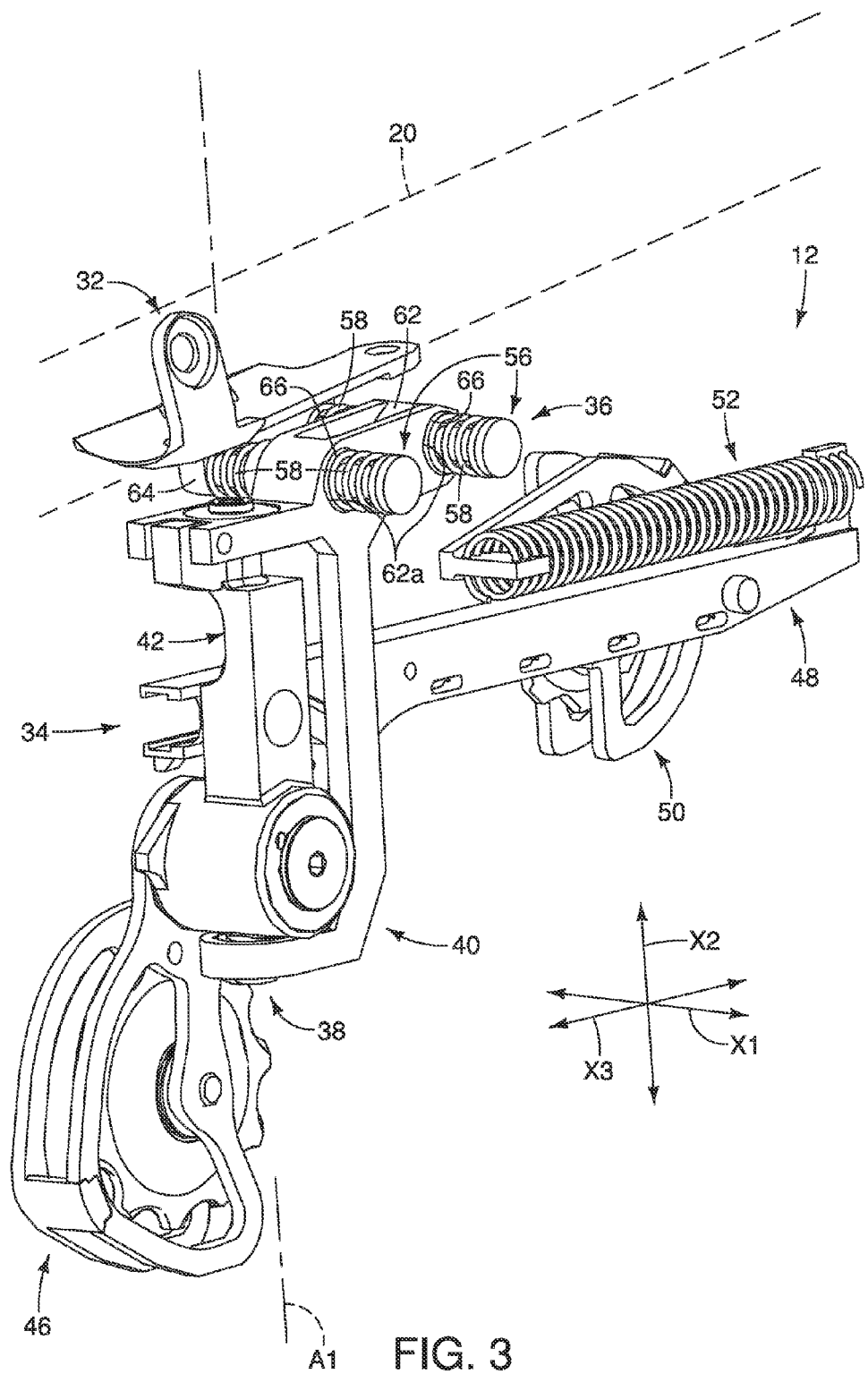
FIG. 3 is an inside perspective view of the bicycle chain tensioner illustrated in FIG. 1.

As illustrated in FIGS. 2 and 3, the bicycle chain tensioner 12 basically includes a bicycle mounting bracket 32 and a chain tensioning device 34 (e.g., a chain tensioning element). In the illustrated embodiment, the bicycle chain tensioner 12 also includes a first coupling structure 36, a second coupling structure 38, a base member 40 and a movable member 42. In the illustrated embodiment, the bicycle chain tensioner 12 also includes a first chain engaging element 46, a guiding portion 48, a second chain engaging element 50 (e.g., a chain engaging element), and a second biasing member 52.

As best shown in FIG. 2, the bicycle mounting bracket 32 is configured to be mounted to the bicycle 10. In the illustrated embodiment, the bicycle mounting bracket 32 is made of a metallic material, or any other suitable for securely supporting the chain tensioning device 34 with respect to the bicycle frame 20 of the bicycle 10. The bicycle mounting bracket 32 is integrally formed as a one-piece, unitary member. The bicycle mounting bracket 32 is directly attached to the bicycle frame 20 by a pair of screws (not shown), or any other suitable conventional manner.

The chain tensioning device 34 is movably coupled to the bicycle mounting bracket 32 by the first coupling structure 36 to move in a lateral direction X1 and by the second coupling structure 38 to move in a direction different from the lateral direction X1, during operation of the bicycle chain tensioner 12. In the illustrated embodiment, the lateral direction X1 is substantially perpendicular to a bicycle longitudinal center plane P (see FIGS. 7 to 9). The bicycle longitudinal center plane P extends through a widthwise center of the bicycle frame 20 of the bicycle 10, and extends in a vertical direction X2 and a longitudinal direction X3 that are perpendicular to the lateral direction X1. In other words, the lateral direction X1 is substantially perpendicular to the bicycle longitudinal center plane P, while the vertical direction X2 and the longitudinal direction X3 are substantially parallel to the bicycle longitudinal center plane. In the illustrated embodiment, the chain tensioning device 34 is basically formed by the first chain engaging element 46, the guiding portion 48, the second chain engaging element 50, and the second biasing member 52 to apply tension to the chain 18. The detailed configurations of the first chain engaging element 46, the guiding portion 48, the second chain engaging element 50, and the second biasing member 52 will be further described later.

As shown in FIGS. 2 and 3, the chain tensioning device 34 is slidably coupled to the bicycle mounting bracket 32 by the first coupling structure 36 to move in the lateral direction X1. Specifically, the first coupling structure 36 includes a pair of interchangeable slide shafts 56 and two pairs of first biasing members 58. The slide shafts 56 extend through a pair of through holes 62a of a coupling portion 62 of the base member 40, and are fixedly coupled to a pair of attachment holes 64a of an attachment portion 64 of the bicycle mounting bracket 32 such that the slide shafts 56 extend parallel to the lateral direction X1. The slide shafts 56 are made of steel or any other rigid material suitable for supporting the chain tensioning device 34. As shown in FIG. 3, the slide shafts 56 are disposed through the through holes 62a of the coupling portion 62 of the base member 40 via a pair of linear bushes 66. The bushes 66 are made of plastic material, or any other suitable material for bushing. The bushes 66 are inserted into the through holes 62a of the coupling portion 62, respectively. With this arrangement, the base member 40 is smoothly slidable relative to the bicycle mounting bracket 32 along the slide shafts 56 in the lateral direction X1. In other words, the base member 40 is slidably coupled to the bicycle mounting bracket 32 by a sliding connection to move in the lateral direction X1 during operation of the bicycle chain tensioner 12. In the illustrated embodiment, the chain tensioning device 34 are operatively coupled to the base member 40. Thus, the chain tensioning device 34 is also slidable relative to the bicycle mounting bracket 32 along the slide shafts 56 in the lateral direction X1. With this arrangement, the sliding connection between the bicycle mounting bracket 32 and the base member 40 accommodates lateral movement of the chain 18 during a gear changing operation using the rear derailleur 24 with only a guide pulley.

Figure 9:
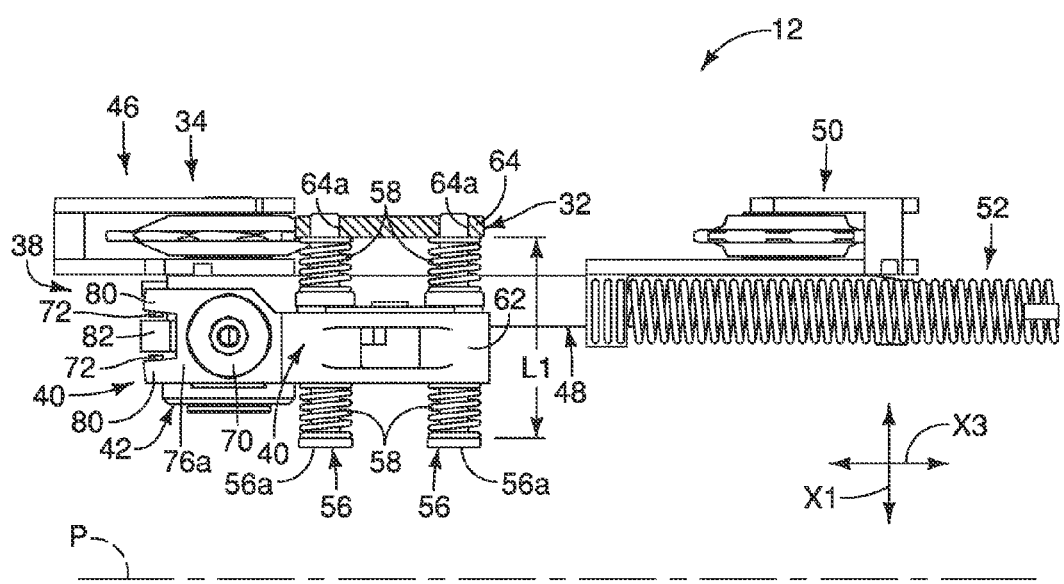
FIG. 9 is a top plan view of the bicycle chain tensioner illustrated in FIG. 1, with a bicycle mounting bracket partially removed.

In the illustrated embodiment, the slide shafts 56 are detachably or interchangeably attached to the base member 40. As shown in FIG. 9, the slide shafts 56 have an effective length L1 that defines an amount of sliding movement of the chain tensioning device 34 relative to the bicycle mounting bracket 32. Thus, if larger sliding movement of the chain tensioning device 34 is desired or needed, then longer slide shafts 56 can be utilized. On the other hand, if smaller sliding movement of the chain tensioning device 34 is desired or needed, then shorter slide shafts 56 are utilized. In other words, the slide shafts 56 are interchangeable according to required or desired amount of sliding movement of the chain tensioning device 34. Thus, the slide shaft 56 with a first prescribed length is replaced with new slide shaft with a second prescribed length to adjust the amount of the slide movement of the base member 40. Alternatively, the effective length of the slide shaft 56 can be adjusted using washers or the like. Of course, it will be apparent to those skilled in the art from this disclosure that the slide shafts 56 can be configured such that the slide shafts 56 are non-interchangeably attached to the base member 40.

Figure 7:
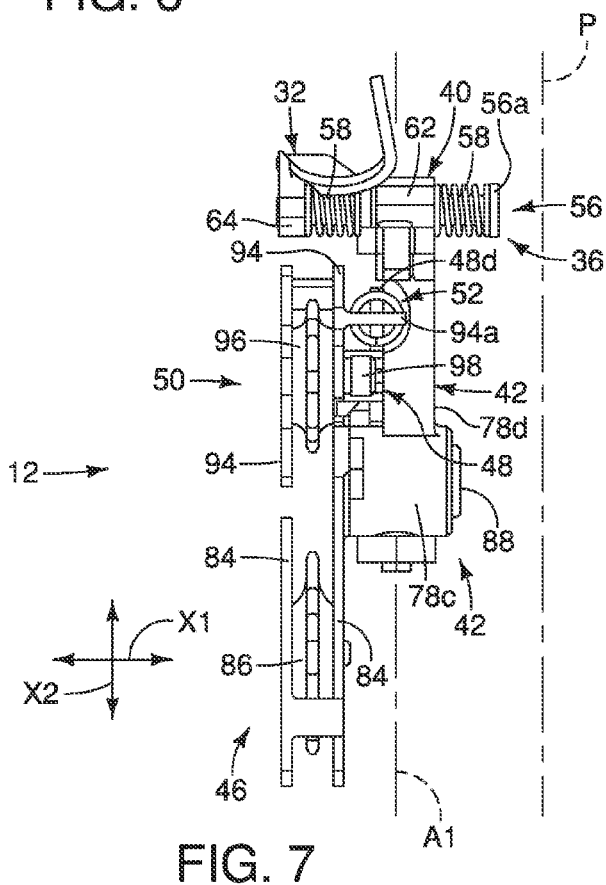
FIG. 7 is a front side elevational view of the bicycle chain tensioner illustrated in FIG. 1.
Figure 8:
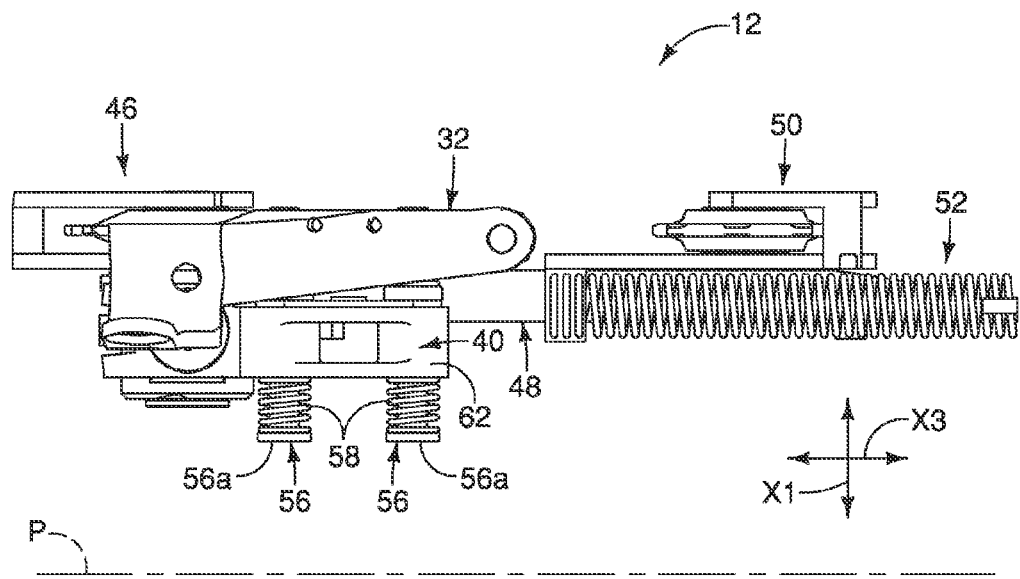
FIG. 8 is a top plan view of the bicycle chain tensioner illustrated in FIG. 1.

As shown in FIGS. 7 to 9, the pairs of the first biasing members 58 are attached to the slide shafts 56, respectively. In the illustrated embodiment, the first biasing members 58 are formed by independent compression springs, respectively (i.e., four compression springs). Of course, the first biasing members 58 can be formed any other suitable biasing elements. The first biasing members 58 bias the chain tensioning device 34 toward a neutral position in the lateral direction X1. In particular, in the illustrated embodiment, with one of the pairs of the first biasing members 58 (i.e., two separate compression springs), one of the first biasing members 58 is concentrically attached to corresponding one of the slide shafts 56 between the coupling portion 62 of the base member 40 and a head portion 56a of the slide shaft 56. On the other hand, the other one of the first biasing members 58 is concentrically attached to the corresponding one of the slide shafts 56 between the coupling portion 62 of the base member 40 and the attachment portion 64 of the bicycle mounting bracket 32. The first biasing members 58 of the other one of the pairs of the first biasing members 58 are also concentrically attached to another one of the slide shafts 56 in the same manner described above. Said shortly, the first biasing members 58 bias the coupling portion 62 of the base member 40 toward the neutral position or center rest position (see FIG. 9), respectively. The neutral position corresponds to axial middle positions on the slide shafts 56 in the lateral direction between the head portions 56a of the slide shafts 56 and an inside surface of the attachment portion 64 of the bicycle mounting bracket 32.

As shown in FIGS. 2 and 3, the chain tensioning device 34 is pivotally coupled to the bicycle mounting bracket 32 by the second coupling structure 38 about a vertical pivot axis A1 substantially parallel to the bicycle longitudinal center plane P and substantially perpendicular to the lateral direction X1. Specifically, in the illustrated embodiment, the movable member 42 is pivotally coupled to the base member 40 by the second coupling structure 38 about the vertical pivot axis A1. The chain tensioning device 34 is operatively coupled to the movable member 42, while the base member 40 is operatively coupled to the bicycle mounting bracket 32. Thus, the chain tensioning device 34 is pivotally coupled to the bicycle mounting bracket 32 via the base member 40 and the movable member 42. Specifically, the chain tensioning device 34 is pivotally coupled to the bicycle mounting bracket 32 such that the orientation of the chain tensioning device 34 relative to the longitudinal direction X3 as viewed in the vertical direction X2 can be automatically adjusted according to the orientation of the chain 18 at the bicycle chain tensioner 12. Specifically, the pivotal connection between the base member 40 and the movable member 42 accommodates angle or lean of the chain 18 with respect to the longitudinal direction X3 as viewed in the vertical direction X2. In particular, when the chain 18 is engaged with a front top sprocket of the front crankset 14 and a rear low sprocket of the rear gear cassette 16, the chain 18 is engaged with the front top sprocket and another rear sprocket in response to a gear changing operation by the rear derailleur 24. Even in this case, the movable member 42 pivots about the vertical pivot axis A1 to accommodate the angle of the chain 18 relative to the longitudinal direction X3. Specifically, even though the angle between the orientation of the chain 18 and the longitudinal direction X3 becomes larger, the bicycle chain tensioner 12 can prevent the chain 18 from being disengaged.

Figure 6:
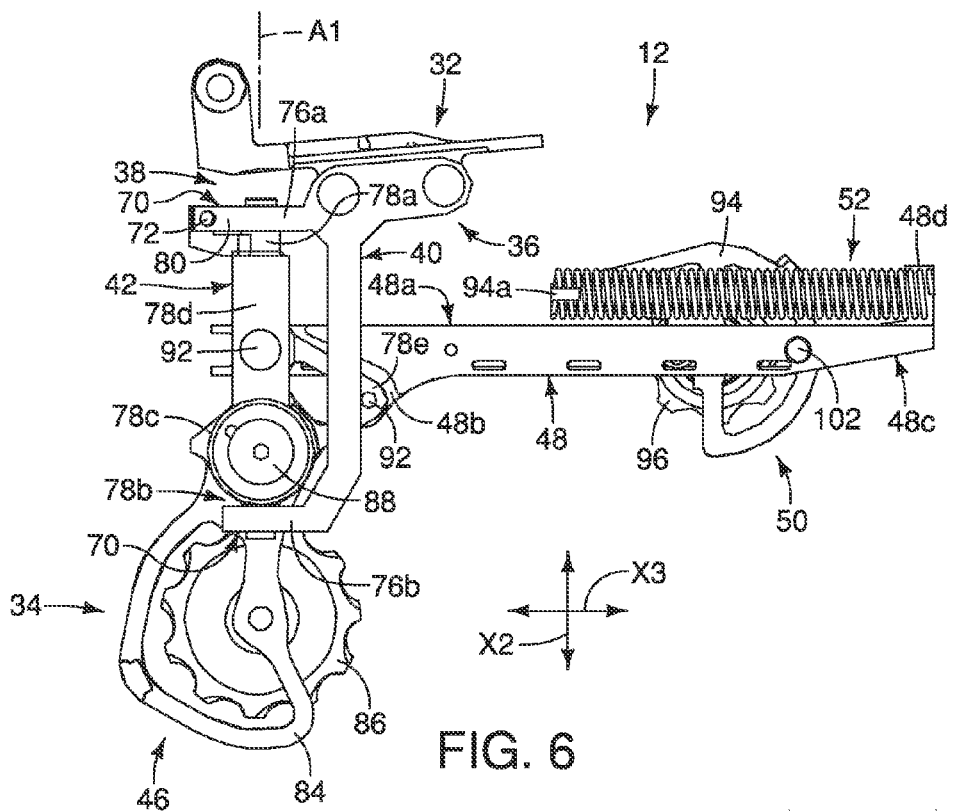
FIG. 6 is an inside elevational view of the bicycle chain tensioner illustrated in FIG. 1, illustrating the bicycle chain tensioner being located at the first position illustrated in FIG. 4.
Figure 10:
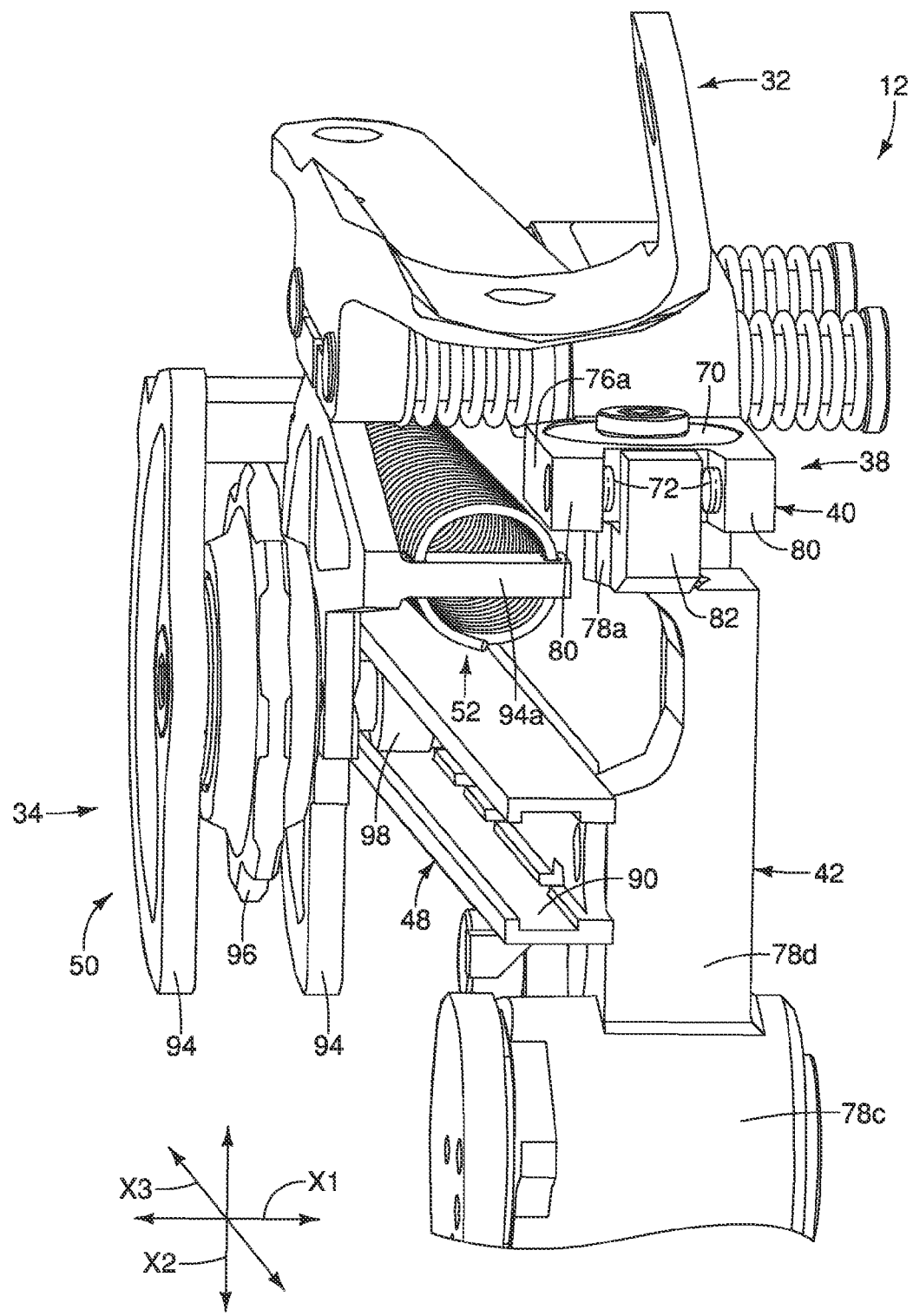
FIG. 10 is an enlarged, partial front perspective view of the bicycle chain tensioner illustrated in FIG. 1.

As shown in FIGS. 6, 9 and 10, the second coupling structure 38 includes a pair of thrust bearings 70 and a pair of adjustment elements 72. The thrust bearings 70 are disposed between the base member 40 and the movable member 42. In the illustrated embodiment, the thrust bearings 70 include plain bearings made of plastic material or any other suitable material for bearings. As best seen in FIG. 6, one of the thrust bearings 70 is disposed between an upper jaw 76a of the base member 40 and an upper bearing support 78a of the movable member 42, while the other one of the thrust bearings 70 is disposed between a lower jaw 76b of the base member 40 and a lower bearing support 78b of the movable member 42. With this arrangement, the movable member 42 is pivotally supported to the base member 40 via the thrust bearings 70 about the vertical pivot axis A1. More specifically, in the illustrated embodiment, the thrust bearings 70 are fixedly coupled to the upper and lower bearing supports 78a and 78b of the movable member 42 with fasteners, adhesive or any other suitable conventional fastening manner. Then, the thrust bearings 70 are pivotally attached to bearing holes formed on the upper and lower jaws 76a and 76b of the base member 40, respectively, which results in that the movable member 42 is pivotally supported to the base member 40 between the upper and lower jaws 76a and 76b of the base member 40.

As shown in FIGS. 6, 9 and 10, the adjustment elements 72 are adjustably arranged for adjusting an amount of pivotal movement of the chain tensioning device 34 relative to the bicycle mounting bracket 32. Specifically, as best seen in FIG. 10, in the illustrated embodiment, the adjustment elements 72 include set screws adjustably coupled to a pair of distal ends 80 of the upper jaw 76a of the base member 40, respectively. The adjustment elements 72 are made of metallic material, such as brass, stainless or any other suitable material. In the illustrated embodiment, the adjustment elements 72 are threaded into screws holes of the distal ends 80 of the upper jaw 76a such that protrusion amounts of the adjustment elements 72 relative to inside surfaces of the distal ends 80 of the base member 40 are adjustable. The movable member 42 has an abutment 82 on an upper end of the movable member 42. The abutment 82 is disposed between the inside surfaces of the distal ends 80 of the base member 40 in the lateral direction X1 white the movable member 42 is pivotally attached to the base member 40. When the adjustment elements 72 inwardly protrude with respect to the inside surfaces of the distal ends 80 of the base member 40, the pivotal movement of the abutment 82 of the movable member 42 is restricted by the adjustment elements 72. In particular, the amount of the pivotal movement of the movable member 42 relative to the base member 40 is adjusted or restricted according to a lateral dimension between distal ends of the adjustment elements 72 in the lateral direction X1. In the illustrated embodiment, the chain tensioning device 34 is operatively coupled to the movable member 42, while the base member 40 is operatively coupled to the bicycle mounting bracket 32. Thus, the amount of pivotal movement of the chain tensioning device 34 relative to the bicycle mounting bracket 32 is adjusted by the adjustment elements 72. In the illustrated embodiment, the adjustment elements 72 include the set screws. However, the adjustment elements 72 can be different type of screws. In the illustrated embodiment, the base member 40 is integrally formed as a one-piece, unitary member, and is made of metallic material or any other suitable material. The movable member 42 is integrally formed as a one-piece, unitary member, and is made of metallic material or any other suitable material. However, of course, it will be apparent to those skilled in the art from this disclosure that the base member 40 and the movable member 42 can be formed by a plurality of parts, respectively, as needed and/or desired.

Figure 4:
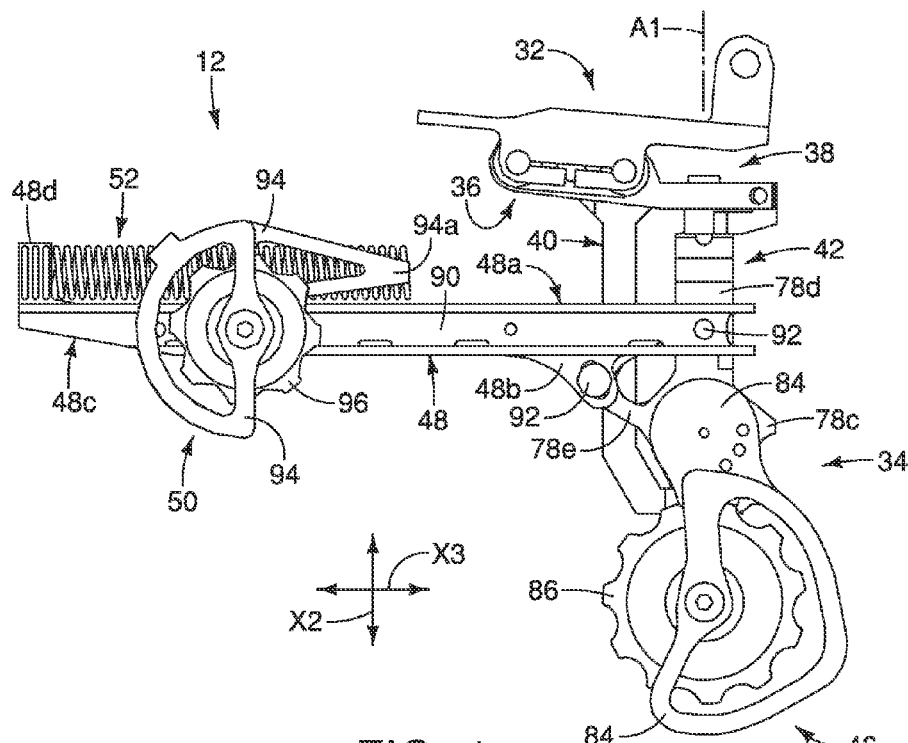
FIG. 4 is an outside elevational view of the bicycle chain tensioner illustrated in FIG. 1, illustrating the bicycle chain tensioner being located at a first position in which a second biasing member of the bicycle chain tensioner is unloaded.
Figure 5:
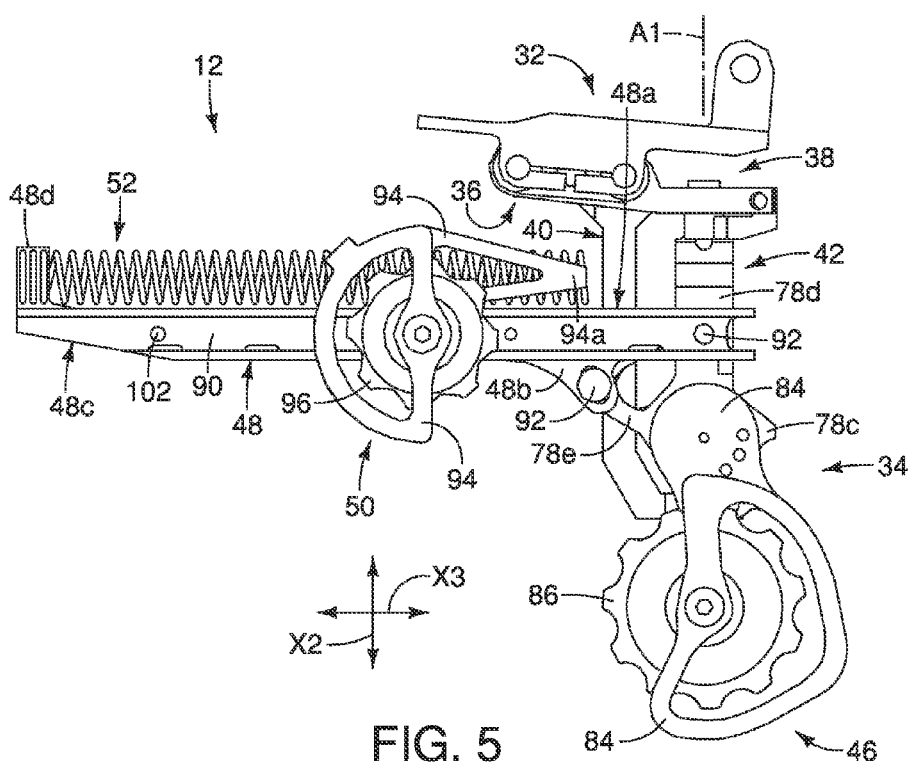
FIG. 5 is an outside elevational view of the bicycle chain tensioner illustrated in FIG. 1, illustrating the bicycle chain tensioner being located at a second position in which the second biasing member of the bicycle chain tensioner is loaded.

Referring now to FIGS. 4 to 10, the chain tensioning device 34 will be described in detail. As shown in FIGS. 4 to 6, the chain tensioning device 34 is basically formed by the first chain engaging element 46, the guiding portion 48, the second chain engaging element 50, and the second biasing member 52 to apply tension to the chain 18. Specifically, the chain tensioning device 34 applies tension to the chain 18 by adjusting a distance between the first chain engaging element 46 and the second chain engaging element 50.

The first chain engaging element 46 is fixedly coupled to the movable member 42. As best shown in FIG. 7, the first chain engaging element 46 basically includes a pair of chain cage plates 84, and a tension pulley 86 rotatably disposed between the chain cage plates 84. In the illustrated embodiment, the first chain engaging element 46 is non-movably mounted to the movable member 42. Specifically, an upper end portion of the inner chain cage plate 84 is secured to a lower body 78c of the movable member 42 by a screw 88. In the illustrated embodiment, the upper end portion of the inner chain cage plate 84 can be fixedly coupled to the movable member 42 in one of a plurality of (e.g., three) securing positions about an axis parallel to the lateral direction X1. Alternatively, the first chain engaging element 46 can be pivotally coupled to the lower body 78c of the movable member 42. In this case, a torsion spring is provided between the first chain engaging element 46 and the movable member 42 to bias the first chain engaging element 46 around a pivot axis in a rotational direction.

The guiding portion 48 is coupled to the bicycle mounting bracket 32. Specifically, the guiding portion 48 is movably coupled to the bicycle mounting bracket 32 by the first coupling structure 36 and the second coupling structure 38. The guiding portion 48 is basically an elongated member having an inside groove 90 extending along the guiding portion 48 in the longitudinal direction X3. The guiding portion 48 is integrally formed as a one-piece, unitary member, and is made of metallic material or any other suitable material. As shown in FIGS. 4 to 6, the guiding portion 48 is fixedly and non-movably coupled to the movable member 42 by a pair of screws 92. Specifically, the guiding portion 48 is secured to an upper body 78d of the movable member 42 by one of the screws 92 at an end part 48a of the guiding portion 48. The guiding portion 48 is also secured to an attachment part 78e of the movable member 42 that extends from the upper and lower bodies 78d and 78c of the movable member 42 by the other one of the screws 92 at an attachment tab 48b of the guiding portion 48. With this arrangement, the guiding portion 48 is secured to the movable member 42 in a cantilevered manner. In the illustrated embodiment, the movable member 42 is movably coupled to the base member 40 by the second coupling structure 38, while the base member 40 is movably coupled to the bicycle mounting bracket 32 by the first coupling structure 36. Thus, the guiding portion 48 is slidable in the lateral direction X1 relative to the bicycle mounting bracket 32, and pivotable about the vertical pivot axis A1 relative to the bicycle mounting bracket 32.

The second chain engaging element 50 is movably coupled to the guiding portion 48. As best shown in FIG. 7, the second chain engaging element 50 basically includes a pair of chain cage plates 94, a tension pulley 96 rotatably disposed between the chain cage plates 94, and a pair of support rollers 98 (only one is shown in FIG. 10) rotatably coupled to the inner chain cage plate 94. In the illustrated embodiment, the second chain engaging element 50 is slidably mounted to the guiding portion 48. Specifically, the support rollers 98 are attached to the inner chain cage plate 94 by a pair of pins or screws. As shown in FIG. 10, the support rollers 98 are slidably disposed within the inside groove 90 of the guiding portion 48 such that the second chain engaging element 50 is slidable relative to the guiding portion 48 between a first position (see FIG. 4) and a second position (see FIG. 5). As shown in FIGS. 4 and 5, the first position is father from the end part 48a of the guiding portion 48 that is secured to the movable member 42 than the second position. As shown in FIGS. 5 and 6, the slide movement of the second chain engaging element 50 beyond the first position is restricted by a retaining pin 102 attached to the guiding member 48. The distal end of the retaining pin 102 protrudes within the inside groove 90. The distal end of the retaining pin 102 contacts with one of the support rollers 98 within the inside groove 90 when the second chain engaging element 50 is located at the first position, which restricts the slide movement of the second chain engaging element 50 beyond the first position.

The second biasing member 52 is coupled to the guiding portion 48. Specifically, as shown in FIGS. 4 to 6, the second biasing member 52 is coupled to another end part 48c (e.g., one end part) of the guiding portion 48. The end part 48c is located at an opposite end of the end part 48a. More specifically, one end of the second biasing member 52 is directly fixed to a securing part 48d of the guiding portion 48 that is formed at the end part 48c, while the other end of the second biasing member 52 is directly fixed to a securing part 94a of the inner chain cage plate 94 of the second chain engaging element 50. With this arrangement, the second biasing member 52 is operatively disposed between the guiding portion 48 and the second chain engaging element 50 such that the second biasing member 52 biases the second chain engaging element 50 to the first position. In the illustrated embodiment, as shown in FIGS. 4 to 10, the second biasing member 52 is arranged along a top surface of the guiding portion 48 such that the second biasing member 52 overlaps with the guiding portion 48 as viewed in the vertical direction X2 (see FIGS. 8 and 9). Of course, the second biasing member 52 can be arranged along a side surface of the guiding portion 48 such that the second biasing member 52 overlaps with the guiding portion 48 as viewed in the lateral direction X1. In other words, the second biasing member 52 can overlap with the guiding portion 48 as view along at least one of the lateral direction X1 and the vertical direction X2. In the illustrated embodiment, the second biasing member 52 includes a tension or extension spring that stretches as the tension is applied. As shown in FIG. 4, while the second chain engaging element 50 is located at the first position, the second biasing member 52 is unloaded and shrunken. On the other hand, while the second chain engaging element 50 is located at the second position, the second biasing member 52 is loaded and stretched, which biases the second chain engaging element 50 to the first position along the guiding portion 48. Of course, it will be apparent to those skilled in the art from this disclosure that the second biasing member 52 can include a compression spring or any other suitable biasing member.

With this configuration, the bicycle chain tensioner 12 apply tension to the chain 18 by sliding the second chain engaging element 50 with respect to the first chain engaging element 46 along the guiding portion 48 in the longitudinal direction X3. Furthermore, the bicycle chain tensioner 12 is equipped with a sliding connection and a pivotal connection between the bicycle mounting bracket 32 and the chain tensioning device 34. Thus, with the bicycle chain tensioner 12 can prevent a chain noise and friction between the chain 18 and the chain tensioning device 34 from occurring. Furthermore, the second biasing member 52 is directly coupled to the guiding portion 48, which results in that the overall size of the bicycle chain tensioner 12 can be made smaller in the longitudinal direction X3, and that the design flexibility in the mounting position of the bicycle chain tensioner 12 to the bicycle frame 20 of the bicycle 10 can be improved.

Second Embodiment

Figure 11:
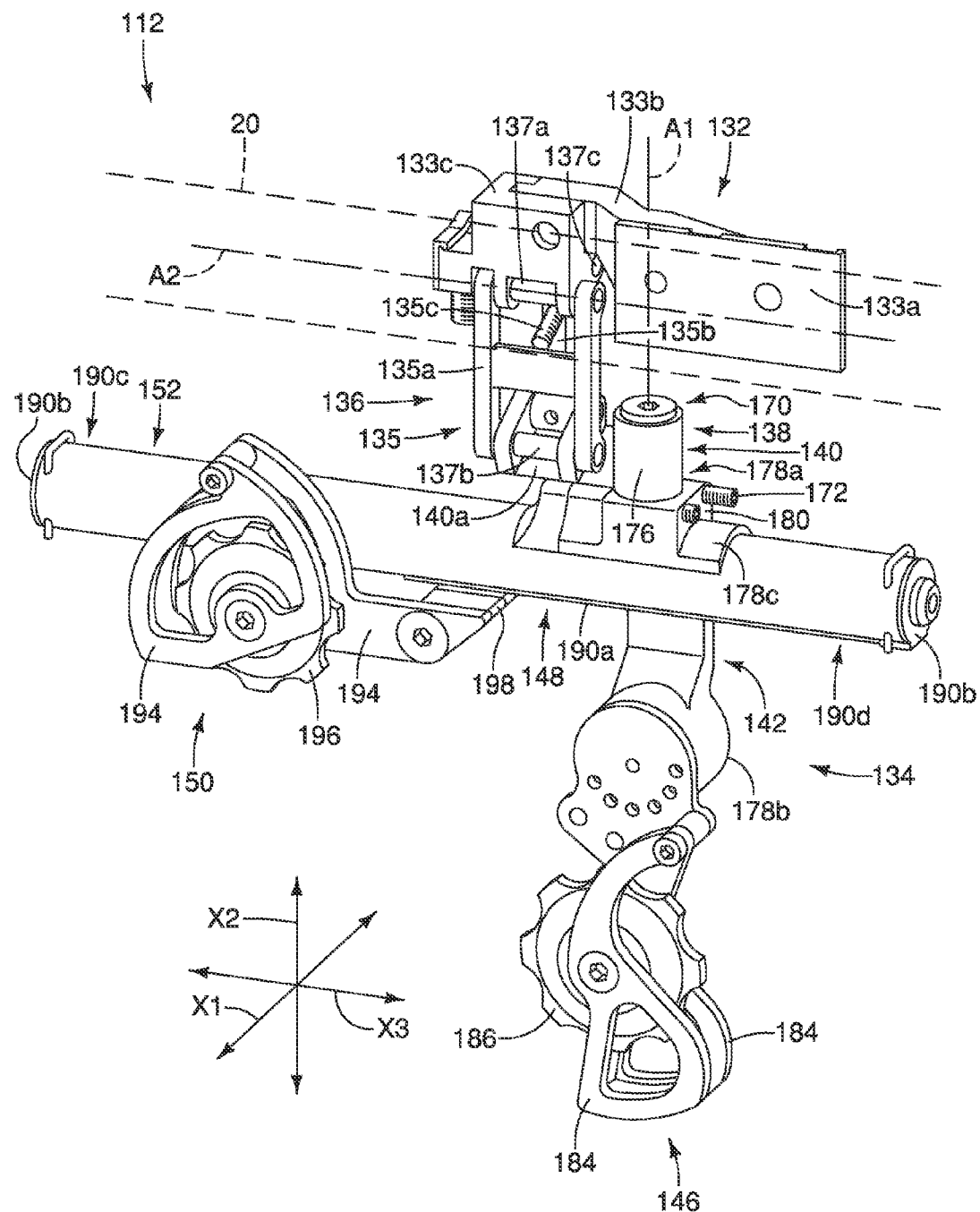
FIG. 11 is an outside perspective view of a bicycle chain tensioner in accordance with a second embodiment.
Figure 12:
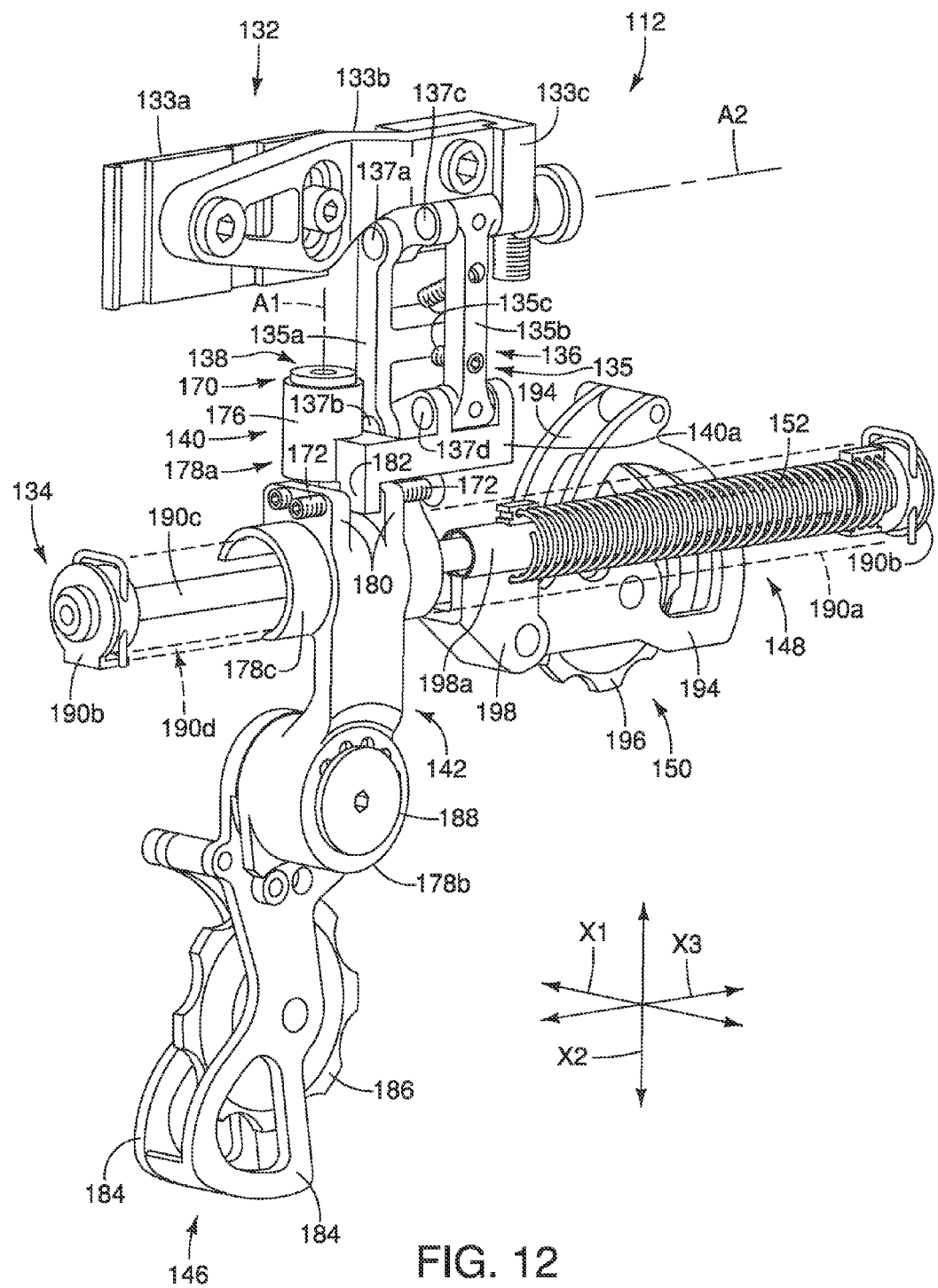
FIG. 12 is an inside perspective view of the bicycle chain tensioner illustrated in FIG. 11, with a part of the bicycle chain tensioner removed.

Referring now to FIGS. 11 and 12, a bicycle chain tensioner 112 in accordance with a second embodiment will now be explained. The bicycle chain tensioner 112 is basically identical to the bicycle chain tensioner 12 in accordance with the first embodiment, except that the sliding connection of the bicycle chain tensioner 12 is replaced with a linkage connection of the bicycle chain tensioner 112, as explained below.

In view of the similarity between the first and second embodiments, the parts of the second embodiment that are identical to the parts of the first embodiment will be given the same reference numerals as the parts of the first embodiment. Also, parts of this second embodiment that are functionally identical and/or substantially identical to parts of the first embodiment will be given the same reference numerals but with "100" added thereto. In any event, the descriptions of the parts of the second embodiment that are substantially identical to the parts of the first embodiment may be omitted for the sake of brevity. However, it will be apparent to those skilled in the art from this disclosure that the descriptions and illustrations of the first embodiment also apply to this second embodiment, except as discussed and/or illustrated herein.

As illustrated in FIGS. 11 and 12, the bicycle chain tensioner 112 basically includes a bicycle mounting bracket 132 and a chain tensioning device 134 (e.g., a chain tensioning element). In the illustrated embodiment, the bicycle chain tensioner 112 also includes a first coupling structure 136, a second coupling structure 138, a base member 140 and a movable member 142. In the illustrated embodiment, the bicycle chain tensioner 112 also includes a first chain engaging element 146, a guiding portion 148, a second chain engaging element 150 (e.g., a chain engaging element), and a second biasing member 152.

The bicycle mounting bracket 132 is configured to be mounted to the bicycle 10 (see FIG. 1). The bicycle mounting bracket 132 securely supports the chain tensioning device 134 with respect to the bicycle frame 20 (see FIG. 1) of the bicycle 10. The bicycle mounting bracket 132 is directly attached to the bicycle frame 20 by screws (not shown), or any other suitable conventional manner. In the illustrated embodiment, the bicycle mounting bracket 132 includes a base part 133a, an intermediate part 133b, and a support part 133c. The base part 133a is directly coupled to the bicycle frame 20. The intermediate part 133b is adjustably coupled to the base part 133a by screws. Specifically, the intermediate part 133b is pivotally adjustable about a pivot axis parallel to a lateral direction X1. The support part 133c is fixedly coupled to the intermediate part 133b by a screw. In the illustrated embodiment, the bicycle mounting bracket 132 are formed by three pieces. However, it will be apparent to those skilled in the art from this disclosure that the bicycle mounting bracket 132 can be integrally formed as a one-piece, unitary member as needed and/or desired.

The chain tensioning device 134 is movably coupled to the bicycle mounting bracket 132 by the first coupling structure 136 to move in the lateral direction X1 and by the second coupling structure 38 to move in a direction different from the lateral direction X1, during operation of the bicycle chain tensioner 112. The chain tensioning device 134 is pivotally coupled to the bicycle mounting bracket 132 by the first coupling structure 136 to pivot about a longitudinal pivot axis A2. In the illustrated embodiment, the longitudinal pivot axis A2 extends in a direction non-parallel to a bicycle longitudinal center plane P. However, of course, the longitudinal pivot axis A2 can extend in a direction that is substantially parallel to a bicycle longitudinal center plane P (see FIG. 8) and substantially perpendicular to the lateral direction X1.

In particular, in the illustrated embodiment, the first coupling structure 136 includes a linkage 135. The linkage 135 operatively connects the bicycle mounting bracket 132 and the base member 140. In the illustrated embodiment, the linkage 135 includes a first or outer link 135a and a second or inner link 135b. The outer and inner links 135a and 135b are made of metallic material or any other suitable material. One end of the outer link 135a is pivotally connected to the support part 133c of the bicycle mounting bracket 132 by a pivot pin 137a about a first pivot axis. The other end of the outer link 135a is pivotally connected to an attachment part 140a of the base member 140 by a pivot pin 137b about a second pivot axis. One end of the inner link 135b is pivotally connected to the support part 133c of the bicycle mounting bracket 132 by a pivot pin 137c about a third pivot axis. The other end of the inner link 135b is pivotally connected to the attachment part 140a of the base member 140 by a pivot pin 137d about a fourth pivot axis. Thus, the outer and inner links 135a and 135b have first ends pivotally connected to the bicycle mounting bracket 132 and second ends pivotally connected to the base member 140 to define a four bar linkage arrangement. In the illustrated embodiment, the base member 140 is operatively connected to the chain tensioning device 134. Thus, the chain tensioning device 134 is pivotally coupled to the bicycle mounting bracket 132 by the first coupling structure 136 to pivot about the longitudinal pivot axis A2. The inner link 135b includes a pair of stopper pins 135c that extends toward the outer link 135a. The stopper pins 135c of the inner link 135b contacts with the outer link 135a to prevent the base member 140 from moving outward of a desired range of pivotal movement of the chain tensioning device 134 about the longitudinal pivot axis A2. Alternatively or additionally, the linkage 135 can include a biasing member that is interposed between the outer and inner links 135a and 135b to bias the chain tensioning device 134 toward a neutral position in the lateral direction X1 in a conventional manner.

The base member 140 pivotally supports the movable member 142 by the second coupling structure 138 about the vertical pivot axis A1. The chain tensioning device 134 is operatively coupled to the movable member 142, while the base member 140 is operatively coupled to the bicycle mounting bracket 132. Thus, the chain tensioning device 134 is pivotally coupled to the bicycle mounting bracket 132 via the base member 140 and the movable member 142.

The second coupling structure 138 includes a thrust bearing 170 and a pair of adjustment elements 172. The thrust bearing 170 is disposed between the base member 140 and the movable member 142. In the illustrated embodiment, the thrust bearing 170 include plain bearings made of plastic material or any other suitable material for bearings. The thrust bearing 170 is fixedly coupled to a bearing support 178a of the movable member 142 with fasteners, adhesive or any other suitable conventional fastening manner. Then, the thrust bearing 170 is pivotally attached to a bearing hole formed on an attachment part 176 of the base member 140, which results in that the movable member 142 is pivotally supported to the base member 140.

The adjustment elements 172 are adjustably arranged for adjusting an amount of the pivotal movement of the chain tensioning device 134 relative to the bicycle mounting bracket 132 about the vertical pivot axis A1. Specifically, in the illustrated embodiment, the adjustment elements 172 include a pair of set screws adjustably coupled to a pair of flanges 180 of the movable member 142, respectively. The adjustment elements 172 are made of metallic material, such as brass, stainless or any other suitable material. In the illustrated embodiment, the adjustment elements 172 are threaded into screws holes of the flanges 180 of the movable member 142, respectively, such that protrusion amounts of the adjustment elements 172 relative to inside surfaces of the flanges 180 of the movable member 142 are adjustable. The base member 140 has an abutment 182. The abutment 182 is disposed between the inside surfaces of the flanges 180 of the movable member 142 in the longitudinal direction X3 while the movable member 142 is pivotally attached to the base member 140. When the adjustment elements 172 inwardly protrude with respect to the inside surfaces of the flanges 180 of the movable member 142, the pivotal movement of the abutment 182 of the base member 140 is restricted by the adjustment elements 172. In particular, the amount of the pivotal movement of the movable member 142 relative to the base member 140 is adjusted or restricted according to a longitudinal dimension between distal ends of the adjustment elements 172 in the longitudinal direction X3. In the illustrated embodiment, the chain tensioning device 134 is operatively coupled to the movable member 142, while the base member 140 is operatively coupled to the bicycle mounting bracket 132. Thus, the amount of pivotal movement of the chain tensioning device 134 relative to the bicycle mounting bracket 132 is adjusted by the adjustment elements 172. In the illustrated embodiment, the base member 140 is integrally formed as a one-piece, unitary member, and is made of metallic material or any other suitable material. The movable member 142 is integrally formed as a one-piece, unitary member, and is made of metallic material or any other suitable material. However, of course, it will be apparent to those skilled in the art from this disclosure that the base member 140 and the movable member 142 can be formed by a plurality of parts, respectively, as needed and/or desired.

The chain tensioning device 134 is basically formed by the first chain engaging element 146, the guiding portion 148, the second chain engaging element 150, and the second biasing member 152 to apply tension to the chain 18 (see FIG. 1). Specifically, the chain tensioning device 134 applies tension to the chain 18 by adjusting a distance between the first chain engaging element 146 and the second chain engaging element 150.

The first chain engaging element 146 is fixedly coupled to the movable member 142. The first chain engaging element 146 is basically includes a pair of chain cage plates 184, and a tension pulley 186 rotatably disposed between the chain cage plates 184. In the illustrated embodiment, the first chain engaging element 146 is non-movably mounted to the movable member 142. Specifically, an upper end portion of the inner chain cage plate 184 is secured to a lower body 178b of the movable member 142 by a screw 188. The first chain engaging element 146 is basically identical to the first chain engaging element 46 in accordance with the first embodiment. Thus, detailed description will be omitted for the sake of brevity.

The guiding portion 148 is basically an elongated member. The guiding portion 148 mainly has an outer case 190a, a pair of end caps 190b and an inner rod 190c. The outer case 190a is fixedly coupled to an upper clamping body 178c of the movable member 142 such that the upper clamping body 178c clamps an outer peripheral surface of the outer case 190a. The outer case 190a is also fastened to the upper clamping body 178c of the movable member 142 by a screw or any other suitable fastening manner. The end caps 190b are attached to ends of the outer case 190a. The inner rod 190c extends between the end caps 190b in the longitudinal direction X3. With this arrangement, the guiding portion 148 is secured to the movable member 142 in a cantilevered manner. In the illustrated embodiment, the movable member 142 is movably coupled to the base member 140 by the second coupling structure 138, while the base member 140 is movably coupled to the bicycle mounting bracket 132 by the first coupling structure 136. Thus, the guiding portion 148 is pivotable in the lateral direction X1 relative to the bicycle mounting bracket 132, and pivotable about the vertical pivot axis A1 relative to the bicycle mounting bracket 132.

The second chain engaging element 150 is movably coupled to the guiding portion 148. The second chain engaging element 150 basically includes a pair of chain cage plates 194, a tension pulley 196 rotatably disposed between the chain cage plates 194, and a support arm 198 extending from the inner chain cage plate 194. In the illustrated embodiment, the second chain engaging element 150 is slidably mounted to the guiding portion 148. Specifically, the support arm 198 is attached to the inner chain cage plate 194 by a screw. The support arm 198 extends through a guide slot 190d formed on the outer case 190a. The guide slot 190d extends in the longitudinal direction X3 to define a slidable range of the sliding movement of the second chain engaging element 150 relative to the guiding portion 148. The support arm 198 has a tubular portion 198a at a distal end (see FIG. 12) thereof. The tubular portion 198a is slidably coupled to the inner rod 190c of the guiding portion 148 inside the outer case 190a of the guiding portion 148 such that the second chain engaging element 150 is slidable relative to the guiding portion 148 between a first position (see FIGS. 11 and 12) and a second position along the inner rod 190c.

The second biasing member 152 is coupled to the guiding portion 148. Specifically, the second biasing member 152 is fixedly coupled to one of the end caps 190b of the guiding portion 148. The one of the end caps 190b of the guiding portion 148 is positioned farther from a clamping position at which the movable member 142 clamps the guiding portion 148 than the other one of the end caps 190b is. In the illustrated embodiment, one end of the second biasing member 152 is directly fixed to the one of the end caps 190b of the guiding portion 148, while the other end of the second biasing member 152 is directly fixed to a securing part of the tubular portion 198a of the second chain engaging element 150. With this arrangement, the second biasing member 152 is operatively disposed between the guiding portion 148 and the second chain engaging element 150 such that the second biasing member 152 biases the second chain engaging element 150 to the first position towards the one of the end caps 190b of the guiding portion 148. In the illustrated embodiment, the second biasing member 152 includes a tension or extension spring that stretches as the tension is applied. Thus, while the second chain engaging element 150 is located at the first position, the second biasing member 152 is unloaded and shrunken. On the other hand, while the second chain engaging element 150 is located at the second position, the second biasing member 152 is loaded and stretched, which biases the second chain engaging element 150 to the first position along the guiding portion 148. Of course, it will be apparent to those skilled in the art from this disclosure that the second biasing member 152 can include a compression spring or any other suitable biasing member.

Figure 14:
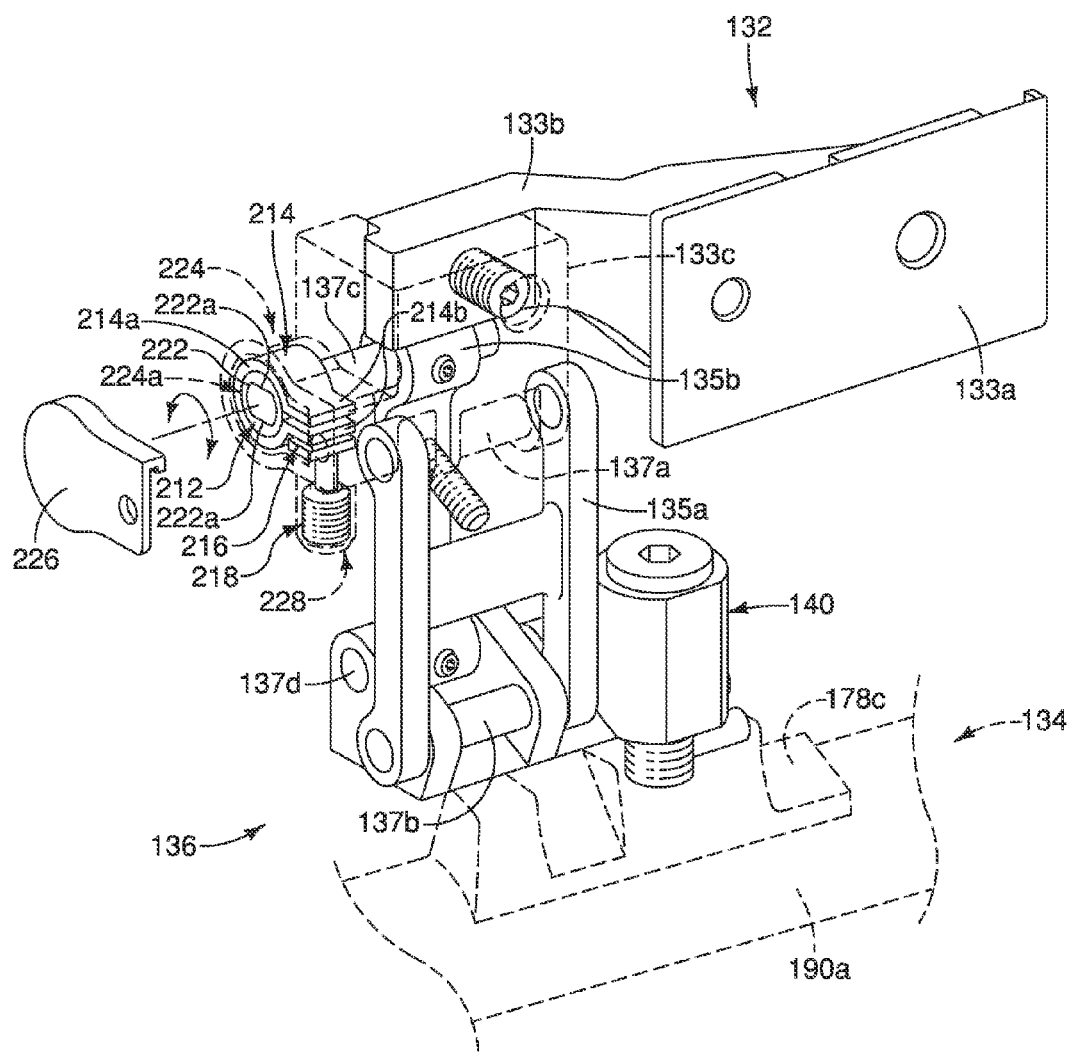
FIG. 14 is an exploded partial perspective view of the first coupling structure of the bicycle chain tensioner illustrated in FIG. 13, with a support part removed from the first coupling structure.

Alternatively or additionally, as illustrated in FIGS. 113 and 14, with a modified example of the bicycle chain tensioner 112 in accordance with the second embodiment, the first coupling structure 136 can includes a damping structure 210 that is configured to damp movement of the chain tensioning device 134 (e.g., the chain tensioning element) relative to the bicycle mounting bracket 132.

More specifically, the damping structure 210 is operatively disposed between the bicycle mounting bracket 132 and the chain tensioning device 134, and damps lateral movement of the chain tensioning device 134 relative to the bicycle mounting bracket 132. In particular, as shown in FIG. 14, the damping structure 210 has the pivot pin 137c (e.g., the link axle) with a bushing 212 (e.g., a sliding part), and a clamp member 214 (e.g., a friction generating member) frictionally coupled to the bushing 212 of the pivot pin 137c (e.g., the sliding part of the link axle). The damping structure 210 also includes a four-sided or square nut 216 and an adjustment screw 218 (e.g., a friction adjustment member).

The bushing 212 is basically a tubular member made of resin, such as a plastic. Of course, the bushing 212 can be made of other material, such as metal, suitable for forming a plain bearing. The bushing 212 is fixedly coupled to an end portion 222 of the pivot pin 137c (e.g., the axle) of the linkage 135. The end portion 222 of the pivot pin 137c has a pair of flat faces 222a on an outer peripheral surface of the pivot pin 137c such that the end portion 222 has an oval or stadium shaped cross section. The bushing 212 has an inner periphery with a shape corresponding to the oval or stadium shaped cross section of the end portion 222 of the pivot pin 137c. Thus, the bushing 212 is non-rotatably coupled to the end portion 222 of the pivot pin 137c. Of course, alternatively, the end portion 222 of the pivot pin 137c can have a circular outer peripheral surface, and the bushing 212 can have a corresponding circular inner peripheral surface. As illustrated in FIG. 14, the pivot pin 137c is fixedly coupled to the inner 135b with a set screw or other suitable fastening manner such that the pivot pin 137c and the inner link 135b integrally pivot together with respect to the support part 133c. In other words, the first coupling structure 136 further includes the linkage 135 pivotally coupling the chain tensioning device 134 (e.g., the chain tensioning element) relative to the bicycle mounting bracket 132. The linkage 135 has the inner link 135b (e.g., the link member) that is fixedly coupled to the pivot pin 137c (e.g., the link axle) of the damping structure 210.

The clamp member 214 has a ring part 214a and a pair of extension parts 214b that extend radially outward from both circumferential ends of the ring part 214a such that the extension parts 214b circumferentially face with each other. The clamp member 214 is integrally formed as a one-piece, unitary member, and is made of sheet metal. Of course, the clamp member 214 can be made of other elastic material, such as resin. The ring part 214a is relatively slidably attached to an outer peripheral face of the bushing 212. In the illustrated embodiment, the ring part 214a is frictionally coupled to the bushing 212 on the pivot pin 137c. The ring part 214a basically forms a torsion spring that biases the extension parts 214b circumferentially away from each other. In the illustrated embodiment, the ring part 214a has an inner diameter that is larger than an outer diameter of the bushing 212 while the clamp member 214 is in a rest state. On the other hand, the ring part 214a has an inner diameter that is smaller than the outer diameter of the bushing 212 while the clamp member 214 is in a loaded state, in which the extension parts 214b are biased towards each other. In other words, the ring part 214a squeezes the outer peripheral face of the bushing 212 to increase frictional coupling force between the clamp member 214 and the bushing 212 on the pivot pin 137c while the clamp member 214 is in the loaded state, which also increases damping of the first coupling structure 136.

Figure 13:
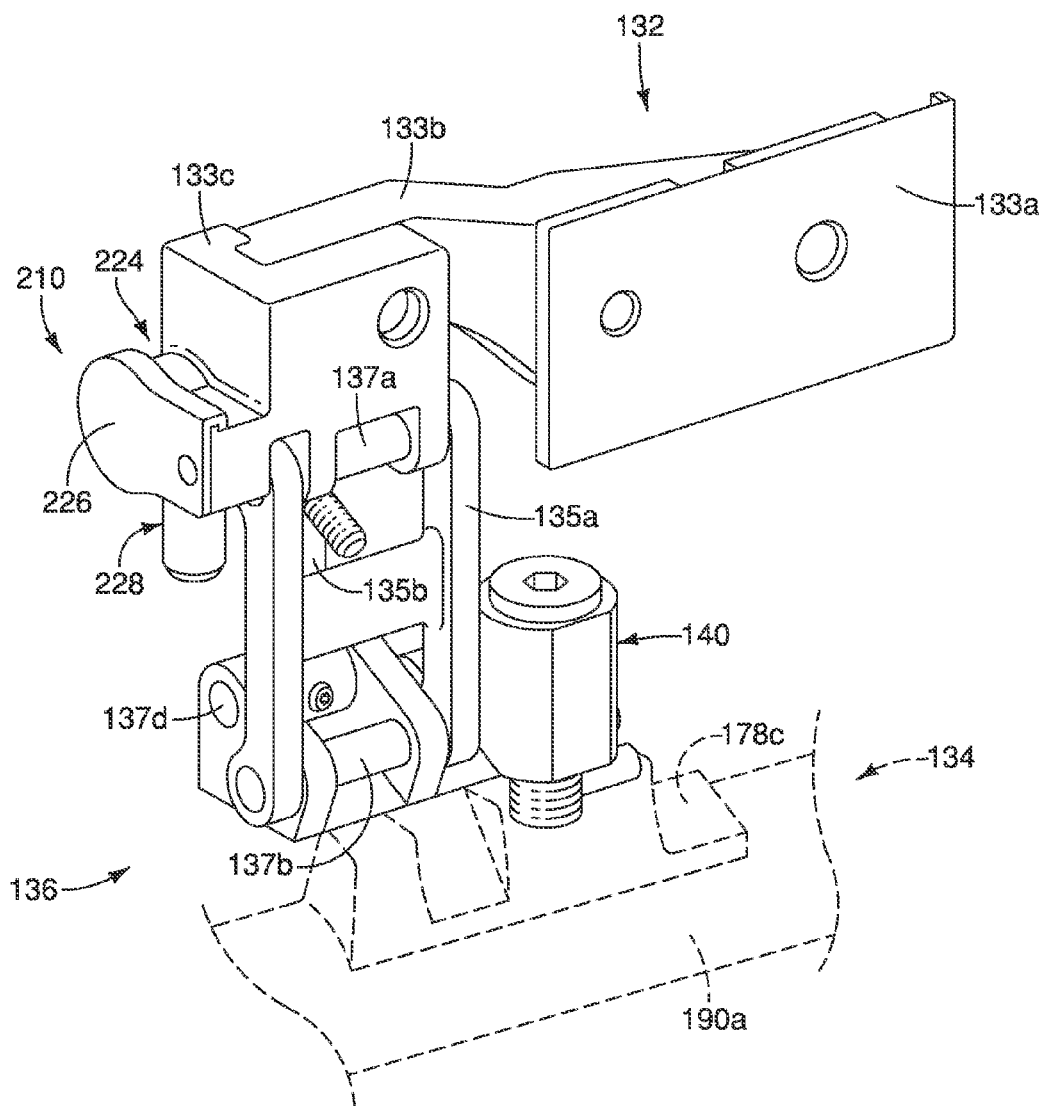
FIG. 13 is an enlarged, partial perspective view of a first coupling structure with a damping structure of a bicycle chain tensioner in accordance with a modified example of the second embodiment.

The bushing 212 and the clamp member 214 are basically housed within a recess 224a of a housing portion 224 of the support part 133c. The recess 224a has a shape that corresponds to an outer profile of the clamp member 214. Thus, the clamp member 214 is non-rotatably fitted within the recess 224a of the housing portion 224. Also, the bushing 212 coupled to the pivot pin 137c is pivotally disposed through the ring part 214a of the clamp member 214. As shown in FIGS. 13 and 14, the recess 224a of the housing portion 224 is covered by a cover 226 detachably attached to the housing portion 224.

The nut 216 is also disposed within the recess 224a of the housing portion 224. The nut 216 has an upper surface that faces with a lower one of the extension parts 214b of the clamp member 214, and a lower surface that is opposite the upper surface. The nut 216 has a threaded through-hole (not shown) on the center of the nut 216 that extends through the nut 216 between the upper and lower surfaces of the nut 216. The adjustment screw 218 is rotatably attached to a screw attachment portion 228 of the housing portion 224. The screw attachment portion 228 has an inner bore (not shown) that communicates with the recess 224a of the housing portion 224. The adjustment screw 218 is disposed through the inner bore of the screw attachment portion 228, and is threadedly coupled to the nut 216. In particular, the adjustment screw 218 is threaded into the threaded through-hole of the nut 216 such that protrusion amounts of a distal end of the adjustment screw 218 relative to the upper surface of the nut 216 are adjustable.

When the adjustment screw 218 is threaded into the threaded through-hole of the nut 216 to increase the protrusion amounts of the adjustment screw 218, then the distal end of the adjustment screw 218 moves the lower one of the extension parts 214b towards the upper one of the extension parts 214b, thereby squeezing the bushing 212 by the ring part 214a and increasing the frictional coupling force of the ring part 214a relative to the bushing 212. This increases the frictional resistance to the relative movement of the support part 133c and the inner link 135b since the clamp member 214 is non-rotatably disposed within the housing portion 224 of the support part 133c, and the pivot pin 137c, to which the bushing 212 is non-rotatably coupled, is fixedly coupled to the inner link 135b. As a result, this also increases damping of the lateral movement of the chain tensioning device 134 relative to the bicycle mounting bracket 132 via the first coupling structure 136. On the other hand, when the adjustment screw 218 is threaded out from the threaded through-hole of the nut 216 to decrease the protrusion amounts of the adjustment screw 218, then the lower one of the extension parts 214b follows the distal end of the adjustment screw 218 away from the upper one of the extension parts 214b due to a spring force of the ring part 214a, thereby releasing the squeeze of the bushing 212 by the ring part 214a and decreasing the frictional coupling force of the ring part 214a relative to the bushing 212. This decreases the frictional resistance to the relative movement of the support part 133c and the inner link 135b. As a result, this also decreases damping of the lateral movement of the chain tensioning device 134 relative to the bicycle mounting bracket 132 via the first coupling structure 136. In other words, in the illustrated embodiment, the damping structure 210 further has the adjustment screw 218 (e.g., the friction adjustment member) that is configured to adjust the frictional coupling force of the clamp member 214 (e.g., the friction generating member) relative to the bushing 212 of the pivot pin 137c (e.g., the sliding part of the link axle).

In the illustrated embodiment, the damping structure 210 is operatively disposed between the support part 133c and the pivot pin 137c. However, alternatively or additionally, the damping structure 210 can be disposed between the support part 133c and any one of the pivot pins 137a, 137b, and 137c. Also, in the illustrated embodiment, the first coupling structure 136 includes only one damping structure 210 at the pivot pin 137c. However, the first coupling structure 136 can include a plurality of damping structures at any one of combinations of the pivot pins 137a, 137b, 137c, and 137d.

In the illustrated embodiment, the first coupling structure 136 includes the damping structure 210 having the clamp member 214 that is frictionally coupled to the bushing 212 of the pivot pin 137c to damp the movement of the first coupling structure 136. However, the first coupling structure 136 can include other type of damping structures. For example, the first coupling structure 136 can include a fluid damper using magnetic fluid as the damping structure, which is controlled by a magnetic field using an electromagnet.

Figure 15:
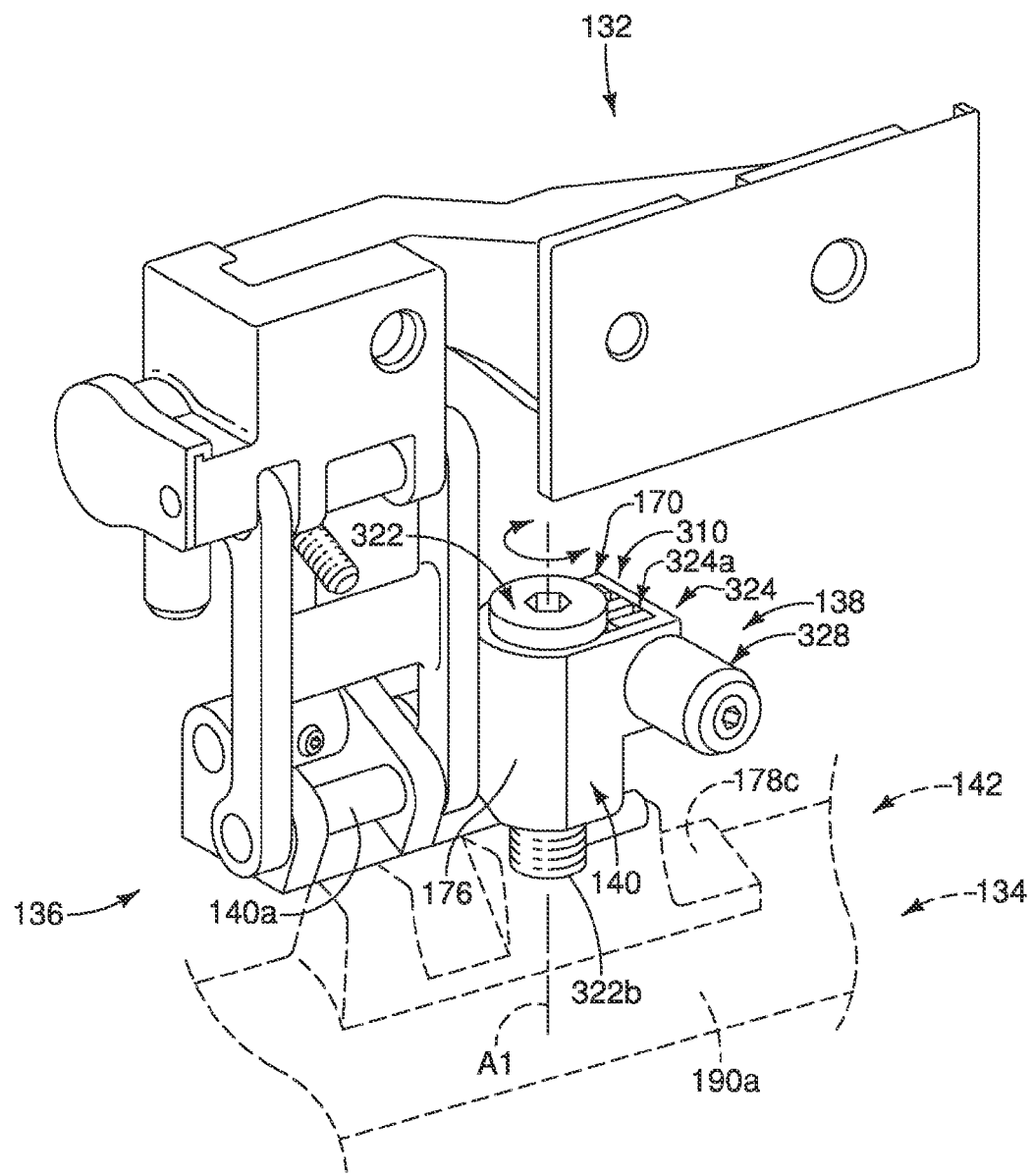
FIG. 15 is an enlarged, partial perspective view of a second coupling structure with a damping structure of a bicycle chain tensioner in accordance with a modified example of the second embodiment.
Figure 16:
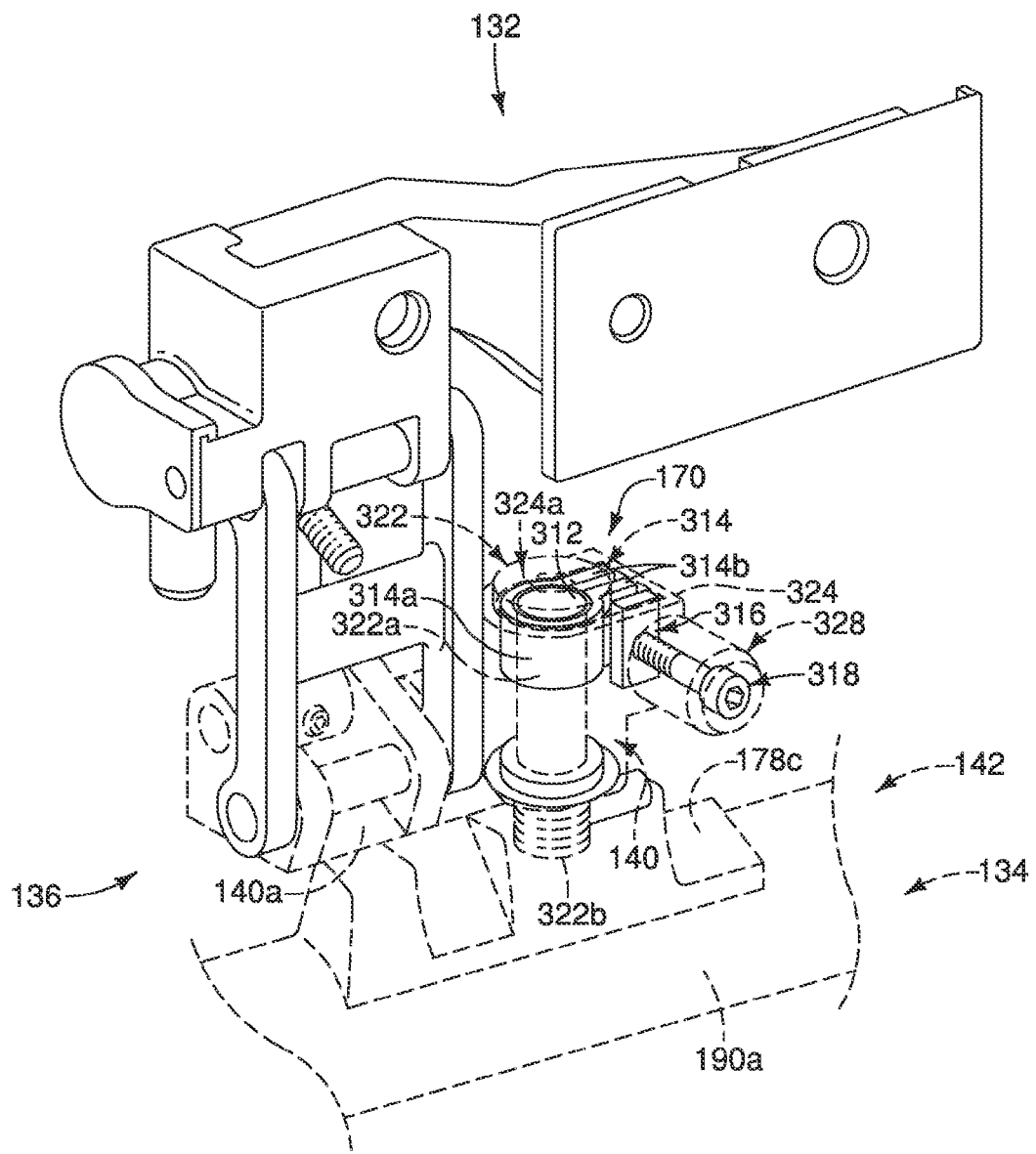
FIG. 16 is an exploded partial perspective view of the second coupling structure of the bicycle chain tensioner illustrated in FIG. 15, with a base member removed from the second coupling structure.

Alternatively or additionally, as illustrated in FIGS. 15 and 16, with another modified example of the bicycle chain tensioner 112 in accordance with the second embodiment, the second coupling structure 138 can includes a damping structure 310 that is configured to damp movement of the chain tensioning device 134 (e.g., the chain tensioning element) relative to the bicycle mounting bracket 132. In the illustrated embodiment, this damping structure 310 can be used in the bicycle chain tensioner 112 in addition to the damping structure 210 shown in FIGS. 13 and 14, or can be used in the bicycle chain tensioner 112 as an alternative to the damping structure 210.

More specifically, the damping structure 310 is operatively disposed between the bicycle mounting bracket 132 and the chain tensioning device 134, and damps pivotal movement of the chain tensioning device 134 relative to the bicycle mounting bracket 132 about the vertical pivot axis A1. In particular, as shown in FIG. 16, the damping structure 310 has a bushing 312 (e.g., a sliding part), and a clamp member 314 (e.g., a friction generating member) frictionally coupled to the bushing 312. The damping structure 310 also includes a four-sided or square nut 316 and an adjustment screw 318 (e.g., a friction adjustment member).

The bushing 312 is basically a tubular member made of resin, such as a plastic. Of course, the bushing 312 can be made of other material, such as metal, suitable for forming a plain bearing. The bushing 312 is fixedly coupled to a non-threaded portion 322a of a bearing shaft 322 of the thrust bearing 170 such that the non-threaded portion 322a of the bearing shaft 322 is disposed through the bushing 312. In the illustrated embodiment, the non-threaded portion 322a has a circular outer peripheral surface, and the bushing 312 has a corresponding circular inner peripheral surface. However, in a manner similar to the end portion 222 of the pivot pin 137c, the non-threaded portion 322a can have a pair of flat faces on the outer peripheral surface, and the bushing 312 can have an inner peripheral surface corresponding to the outer peripheral surface of the non-threaded portion 322a. The bearing shaft 322 also extends through the bearing hole of the attachment part 176 of the base member 140, and a threaded portion 322b of the bearing shaft 322 is threaded into a threaded hole of the upper clamping body 178c of the movable member 142. As a result, the bearing shaft 322 is non-movably coupled to the movable member 142, while the bearing shaft 322 pivotally supports the base member 140 about the vertical pivot axis A1 Thus, the bearing shaft 322 and the movable member 142 integrally pivot together with respect to the base member 140. In other words, the second coupling structure 138 further includes the thrust bearing 170 pivotally coupling the chain tensioning device 134 (e.g., the chain tensioning element) relative to the bicycle mounting bracket 132.

The clamp member 314 has a ring part 314a and a pair of extension parts 314b that extend radially outward from both circumferential ends of the ring part 314a such that the extension parts 314b circumferentially face with each other. The clamp member 314 is integrally formed as a one-piece, unitary member, and is made of sheet metal. Of course, the clamp member 314 can be made of other elastic material, such as resin. The ring part 314a is relatively slidably attached to an outer peripheral face of the bushing 312. In the illustrated embodiment, the ring part 314a is frictionally coupled to the bushing 312 on the bearing shaft 322. The ring part 314a basically forms a torsion spring that biases the extension parts 314b circumferentially away from each other. In the illustrated embodiment, the ring part 314a has an inner diameter that is larger than an outer diameter of the bushing 312 while the clamp member 314 is in a rest state. On the other hand, the ring part 314a has an inner diameter that is smaller than the outer diameter of the bushing 312 while the clamp member 314 is in a loaded state, in which the extension parts 314b are biased towards each other. In other words, the ring part 314a squeezes the outer peripheral face of the bushing 312 to increase frictional coupling force between the clamp member 314 and the bushing 312 on the bearing shaft 322 while the clamp member 314 is in the loaded state, which also increases damping of the second coupling structure 138.

The bushing 312 and the clamp member 314 are basically housed within a recess 324a of a housing portion 324 of the attachment part 176 of the base member 140. The recess 324a has a shape that corresponds to an outer profile of the clamp member 314. Thus, the clamp member 314 is non-rotatably fitted within the recess 324a of the housing portion 324. Also, the bushing 312 coupled to the bearing shaft 322 is pivotally disposed through the ring part 314a of the clamp member 314.

The nut 316 is also disposed within the recess 324a of the housing portion 324. The nut 316 has a first surface that faces with a first one of the extension parts 314b of the clamp member 314, and a second surface that is opposite the first surface. The nut 316 has a threaded through-hole (not shown) on the center of the nut 316 that extends through the nut 316 between the first and second surfaces of the nut 316. The adjustment screw 318 is rotatably attached to a screw attachment portion 328 of the housing portion 324. The screw attachment portion 328 has an inner bore (not shown) that communicates with the recess 324a of the housing portion 324. The adjustment screw 318 is disposed through the inner bore of the screw attachment portion 328, and is threadedly coupled to the nut 316. In particular, the adjustment screw 318 is threaded into the threaded through-hole of the nut 316 such that protrusion amounts of a distal end of the adjustment screw 318 relative to the first surface of the nut 316 are adjustable.

When the adjustment screw 318 is threaded into the threaded through-hole of the nut 316 to increase the protrusion amounts of the adjustment screw 318, then the distal end of the adjustment screw 318 moves the first one of the extension parts 314b towards the second one of the extension parts 314b, thereby squeezing the bushing 312 by the ring part 314a and increasing the frictional coupling force of the ring part 314a relative to the bushing 312. This increases the frictional resistance to the relative movement of the base member 140 and the movable member 142 since the clamp member 314 is non-rotatably disposed within the housing portion 324 of the base member 140, and the bearing shaft 322, to which the bushing 312 is fixedly coupled, is fixedly coupled to the movable member 142. As a result, this also increases damping of the pivotal movement of the chain tensioning device 134 relative to the bicycle mounting bracket 132 via the second coupling structure 138. On the other hand, when the adjustment screw 318 is threaded out from the threaded through-hole of the nut 316 to decrease the protrusion amounts of the adjustment screw 318, then the first one of the extension parts 314b follows the distal end of the adjustment screw 318 away from the second one of the extension parts 314b due to a spring force of the ring part 314a, thereby releasing the squeeze of the bushing 312 by the ring part 314a and decreasing the frictional coupling force of the ring part 314a relative to the bushing 312. This decreases the frictional resistance to the relative movement of the base member 140 and the movable member 142. As a result, this also decreases damping of the pivotal movement of the chain tensioning device 134 relative to the bicycle mounting bracket 132 via the second coupling structure 138. In other words, in the illustrated embodiment, the damping structure 310 further has the adjustment screw 318 that is configured to adjust the frictional coupling force of the clamp member 314 relative to the bushing 312 of the bearing shaft 322.

In the illustrated embodiment, the damping structure 310 is operatively disposed between the base member 140 and the bearing shaft 322. However, alternatively or additionally, the damping structure 310 can be disposed between the movable member 142 and the bearing shaft 322 if the base member 140 is fixedly coupled to the bearing shaft 322, and the movable member 142 is rotatably coupled to the bearing shaft 322.

In the illustrated embodiment, the second coupling structure 138 includes the damping structure 310 having the clamp member 314 that is frictionally coupled to the bushing 312 of the bearing shaft 322 to damp the movement of the second coupling structure 138. However, the second coupling structure 138 can include other type of damping structures. For example, the second coupling structure 138 can include a fluid damper using magnetic fluid as the damping structure, which is controlled by a magnetic field using an electromagnet.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Also, the terms "part," "section," "portion," "member" or "element" when used in the singular can have the dual meaning of a single part or a plurality of parts. Also it will be understood that although the terms "first" and "second" may be used herein to describe various components these components should not be limited by these terms. These terms are only used to distinguish one component from another. Thus, for example, a first component discussed above could be termed a second component and vice-a-versa without departing from the teachings of the present invention. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Moreover, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle chain tensioner comprising:
   a bicycle mounting bracket configured to be mounted to a bicycle; and
   a chain tensioning element slidably coupled to the bicycle mounting bracket by a first coupling structure to linearly slide in a lateral direction, and movably coupled to the bicycle mounting bracket by a second coupling structure to move in a direction different from the lateral direction, during operation of the bicycle chain tensioner.

2. The bicycle chain tensioner according to claim 1, wherein
   the first coupling structure includes an interchangeable slide shaft having an effective length that defines an amount of sliding movement of the chain tensioning element relative to the bicycle mounting bracket.

3. The bicycle chain tensioner according to claim wherein
   the first coupling structure includes a first biasing member biasing the chain tensioning element toward a neutral position in the lateral direction.

4. The bicycle chain tensioner according to claim 1, wherein
   the chain tensioning element is pivotally coupled to the bicycle mounting bracket by the first coupling structure to pivot about a longitudinal pivot axis.

5. The bicycle chain tensioner according to claim 4, wherein
   the first coupling structure includes a damping structure that is configured to damp movement of the chain tensioning element relative to the bicycle mounting bracket.

6. The bicycle chain tensioner according to claim 5, wherein
   the damping structure has a link axle with a sliding part, and a friction generating member frictionally coupled to the sliding part of the link axle.

7. The bicycle chain tensioner according to claim 6, wherein
   the damping structure further has a friction adjustment member that is configured to adjust frictional coupling force of the friction generating member relative to the sliding part of the link axle.

8. The bicycle chain tensioner according to claim 6, wherein
   the first coupling structure further includes a linkage pivotally coupling the chain tensioning element relative to the bicycle mounting bracket, the linkage having a link member that is fixedly coupled to the link axle of the damping structure.

9. The bicycle chain tensioner according to claim 1, wherein
   the chain tensioning element is pivotally coupled to the bicycle mounting bracket by the second coupling structure about a vertical pivot axis substantially parallel to a bicycle longitudinal center plane and substantially perpendicular to the lateral direction.

10. The bicycle chain tensioner according to claim 9, wherein
    the second coupling structure includes an adjustment element adjustably arranged for adjusting an amount of pivotal movement of the chain tensioning element relative to the bicycle mounting bracket.

11. The bicycle chain tensioner according to claim 9, wherein the second coupling structure includes a damping structure that is configured to damp movement of the chain tensioning element relative to the bicycle mounting bracket.

12. The bicycle chain tensioner according to claim 1, further comprising
a guiding portion movably coupled to the bicycle mounting bracket by the first coupling structure and the second coupling structure; and
a chain engaging element movably coupled to the guiding portion.

13. The bicycle chain tensioner according to claim 1, wherein
the lateral direction is substantially perpendicular to a bicycle longitudinal center plane.

14. A bicycle chain tensioner comprising:
a chain tensioning element;
a bicycle mounting bracket configured to be mounted to a bicycle;
a guiding portion slidably coupled to the bicycle mounting bracket to linearly slide in a lateral direction;
a chain engaging element movably coupled to the guiding portion; and
a biasing member coupled to the guiding portion, the biasing member biasing the chain engaging element to a first position, the biasing member overlapping with the guiding portion as view along at least one of the lateral direction and a vertical direction.

15. The bicycle chain tensioner according to claim 14, wherein
the lateral direction is substantially perpendicular to a bicycle longitudinal center plane, and
the vertical direction is substantially parallel to the bicycle longitudinal center plane.

16. A bicycle chain tensioner comprising:
a bicycle mounting bracket configured to be mounted to a bicycle; and
a chain tensioning element slidably coupled to the bicycle mounting bracket by a first coupling structure to slide in a lateral direction, and movably coupled to the bicycle mounting bracket by a second coupling structure to move in a direction different from the lateral direction, during operation of the bicycle chain tensioner,
the first coupling structure including a slide shaft extending parallel to the lateral direction.

17. The bicycle chain tensioner according to claim 1, wherein
the chain tensioning element is pivotally coupled to the bicycle mounting bracket by the second coupling structure.

18. The bicycle chain tensioner according to claim 14, wherein
the guiding portion is pivotable about a vertical pivot axis relative to the bicycle mounting bracket.

19. The bicycle chain tensioner according to claim 16, wherein
the chain tensioning element is pivotally coupled to the bicycle mounting bracket by the second coupling structure.

20. A bicycle chain tensioner comprising:
a bicycle mounting bracket configured to be mounted to a bicycle; and
a chain tensioning element slidably coupled to the bicycle mounting bracket by a first coupling structure to linearly slide in a lateral direction, and movably coupled to the bicycle mounting bracket by a second coupling structure to move in a direction different from the lateral direction, during operation of the bicycle chain tensioner,
the chain tensioning element being pivotally coupled to the bicycle mounting bracket by the second coupling structure about a vertical pivot axis substantially parallel to a bicycle longitudinal center plane and substantially perpendicular to the lateral direction.

21. The bicycle chain tensioner according to claim 20, wherein
the second coupling structure includes an adjustment element adjustably arranged for adjusting an amount of pivotal movement of the chain tensioning element relative to the bicycle mounting bracket.

* * * * *